(12) United States Patent
Suzuki et al.

(10) Patent No.: US 10,677,743 B1
(45) Date of Patent: Jun. 9, 2020

(54) INSPECTION APPARATUS AND INSPECTION METHOD

(71) Applicant: Toshiba Memory Corporation, Minato-ku (JP)

(72) Inventors: Keitarou Suzuki, Yokkaichi (JP); Osamu Nagano, Nagoya (JP); Kouta Kameishi, Yokkaichi (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/546,526

(22) Filed: Aug. 21, 2019

(30) Foreign Application Priority Data

Mar. 19, 2019 (JP) .................................. 2019-050707

(51) Int. Cl.
*G01N 21/956* (2006.01)
*G01N 21/88* (2006.01)
(Continued)

(52) U.S. Cl.
CPC .... *G01N 21/95607* (2013.01); *G01N 21/8806* (2013.01); *G01N 21/956* (2013.01);
(Continued)

(58) Field of Classification Search
CPC .......... G01N 21/9501; G01N 21/9503; G01N 21/9506; G01N 21/9515; G01N 21/95607; G01N 21/47; G01N 21/8806; G01N 21/94; G01N 21/956; G01N 21/896; G01N 2021/95638; G01N 2021/4711; G01N 2021/4714; G01N 2021/4723; G01N 2021/8867; G01N 2021/887; G01N 2021/8874; G01N 2201/10; G01N 2201/101; G01N 2201/103; G01N 2201/104; G01N 2201/1047; G01N 2201/105; H04N 5/37206; H04N 5/374;
(Continued)

(56) References Cited

U.S. PATENT DOCUMENTS 8,804,110 B2   8/2014  Urano et al.
9,240,359 B2   1/2016  Lian
(Continued)

FOREIGN PATENT DOCUMENTS

JP     2018-066767 A     4/2018

*Primary Examiner* — Christina A Riddle
(74) *Attorney, Agent, or Firm* — Oblon, McClelland, Maier & Neustadt, L.L.P.

(57) ABSTRACT

According to an embodiment, an inspection apparatus includes an irradiation mechanism, an imaging device, a movable mechanism, and a control processor. The irradiation mechanism irradiates an inspection target with light. The imaging device captures an image of the inspection target through a lens. The movable mechanism changes, with respect to an axis extending in an inspection direction for the inspection target, an angle between the lens and a horizontal plane or an angle between the imaging device and the horizontal plane such that a sample surface of the inspection target, a principal face of the lens, and an imaging face of the imaging device conform to the Scheimpflug principle. The control processor adjusts sensitivities in an image of the sample surface captured by the imaging device at different levels in the image depending on a position in a perpendicular direction to the inspection direction.

14 Claims, 23 Drawing Sheets

(51) Int. Cl.
 *G01N 21/47* (2006.01)
 *G01N 21/95* (2006.01)
(52) U.S. Cl.
 CPC .. *G01N 21/9501* (2013.01); *G01N 2021/4711* (2013.01); *G01N 2021/8874* (2013.01)
(58) Field of Classification Search
 CPC .... H04N 5/3743; H04N 5/372; G01B 21/002; G01B 21/006; G01B 21/0036; G01B 21/0096; G01B 21/072; G01B 11/30; G01B 11/303; G01B 11/306; G01B 11/24; G01B 11/255; G01B 9/02055; G01B 9/02062; G01B 9/02063; G01B 9/02067; G01B 9/02069; A61B 3/102; A61B 3/0025; G03B 5/00–08; G03B 2205/00–0038; G03B 2205/0053
 USPC ..... 355/52; 356/237.1–237.6, 600, 601–624, 356/335–336, 73, 4.01–5.15
 See application file for complete search history.

(56) References Cited

U.S. PATENT DOCUMENTS

| | | | | |
|---|---|---|---|---|
| 2003/0103277 | A1* | 6/2003 | Mohwinkel | G02B 27/40 359/811 |
| 2004/0012775 | A1* | 1/2004 | Kinney | G01N 21/9501 356/237.2 |
| 2012/0133928 | A1* | 5/2012 | Urano | G01N 21/9501 356/237.2 |
| 2015/0192528 | A1* | 7/2015 | Tang | G01B 11/272 348/126 |
| 2015/0222820 | A1* | 8/2015 | Costigan | H04N 3/155 348/142 |
| 2015/0241361 | A1* | 8/2015 | Urano | G01N 21/9501 356/237.5 |

* cited by examiner

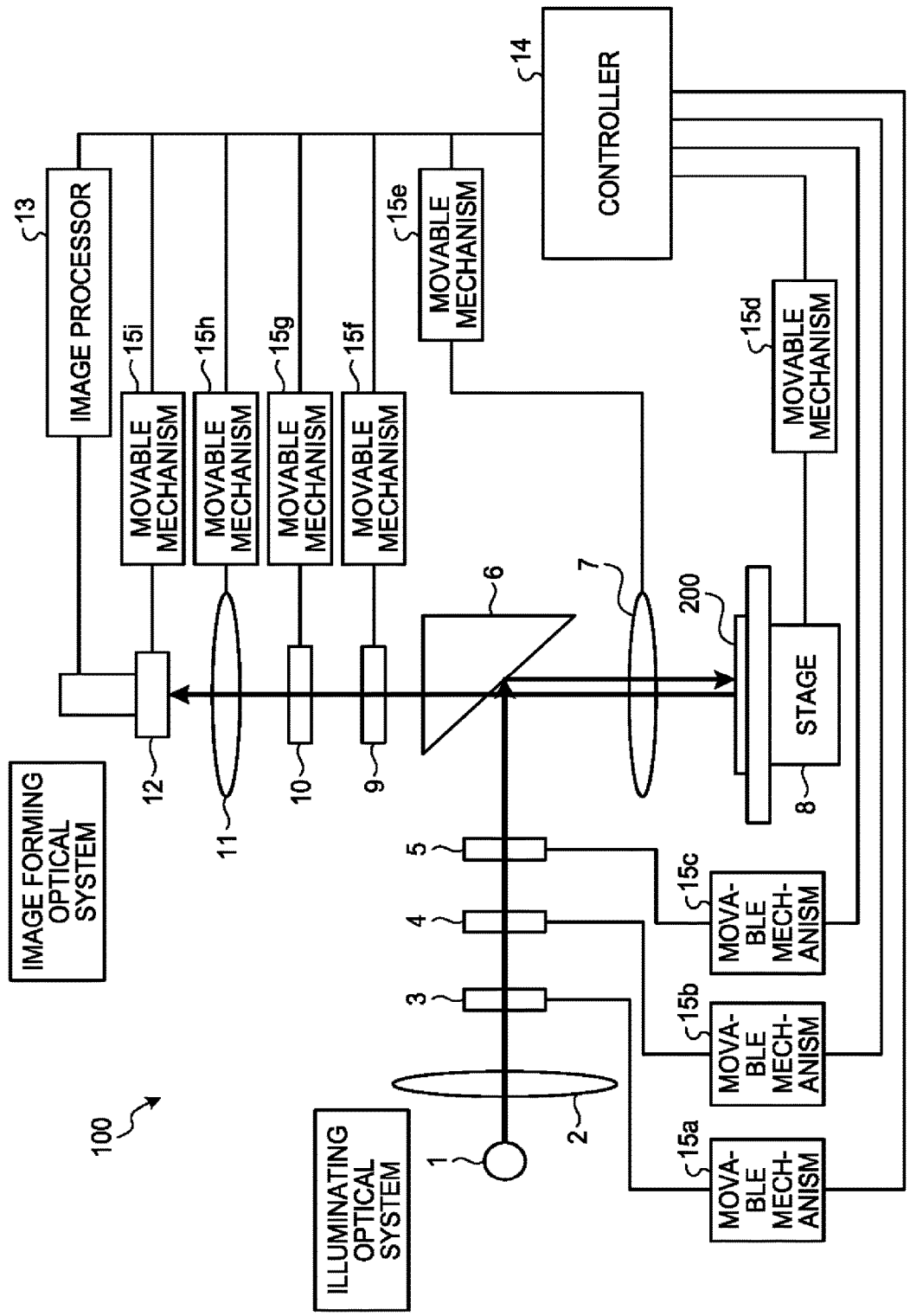

FIG.7

| | DIFFERENCE BETWEEN IMAGES AT POSITION A | DIFFERENCE BETWEEN IMAGES AT POSITION B | DIFFERENCE BETWEEN IMAGES AT POSITION C |
|---|---|---|---|
| ● PATTERN ON PLANE [A] [B] [C] | FOUR TO FIVE PIXELS IN ONE HOLE | FOUR TO FIVE PIXELS IN ONE HOLE | FOUR TO FIVE PIXELS IN ONE HOLE |
| ● PATTERN WITH DIFFERENCE OF ELEVATION [A] [B] [C] | NINE TO TEN PIXELS IN ONE HOLE | FOUR TO FIVE PIXELS IN ONE HOLE | ONE TO TWO PIXEL(S) IN ONE HOLE |

*ILLUSTRATE ONLY PATTERNS AT POSITIONS A, B, AND C FOR SIMPLIFICATION OF ILLUSTRATION

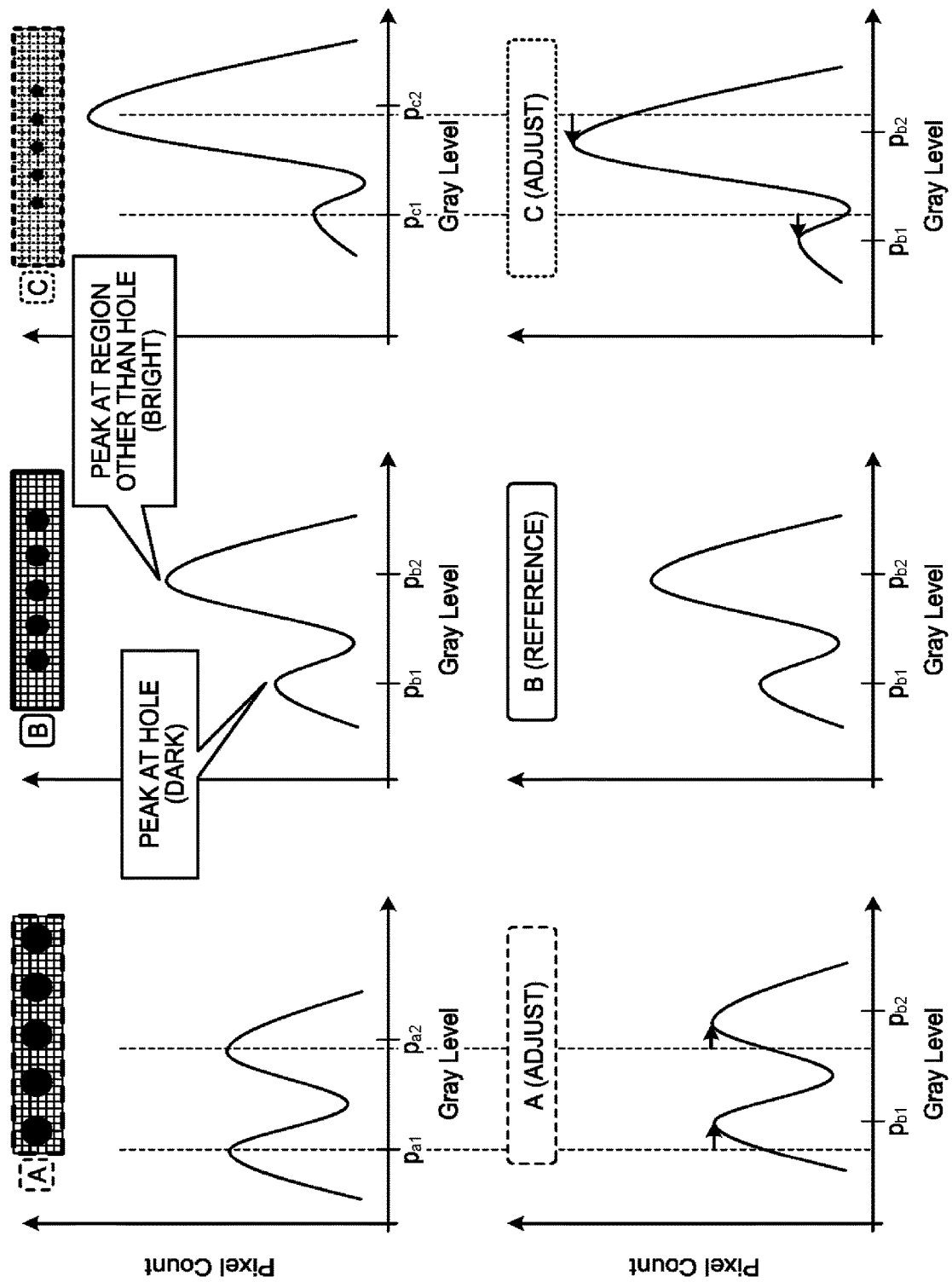

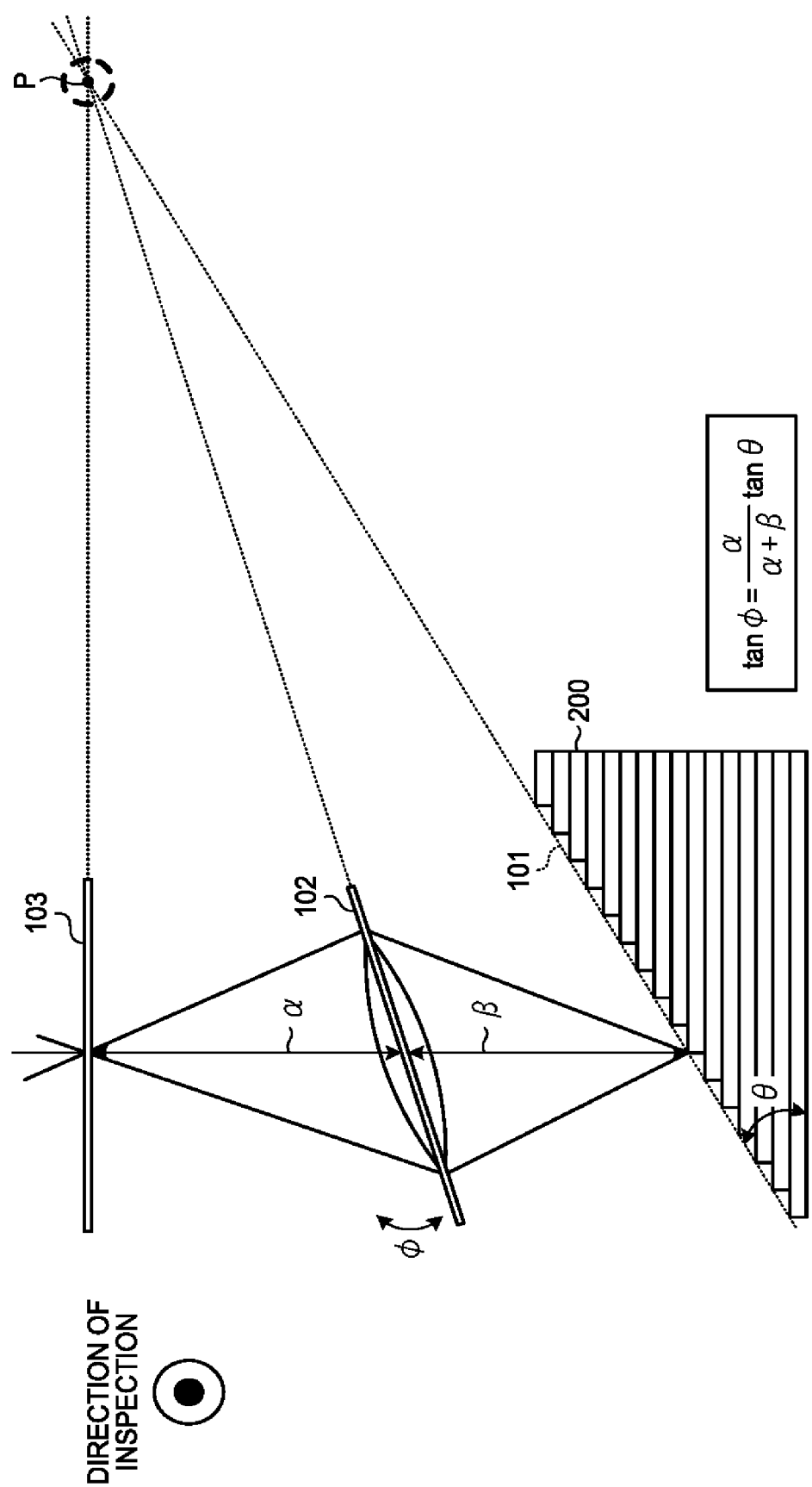

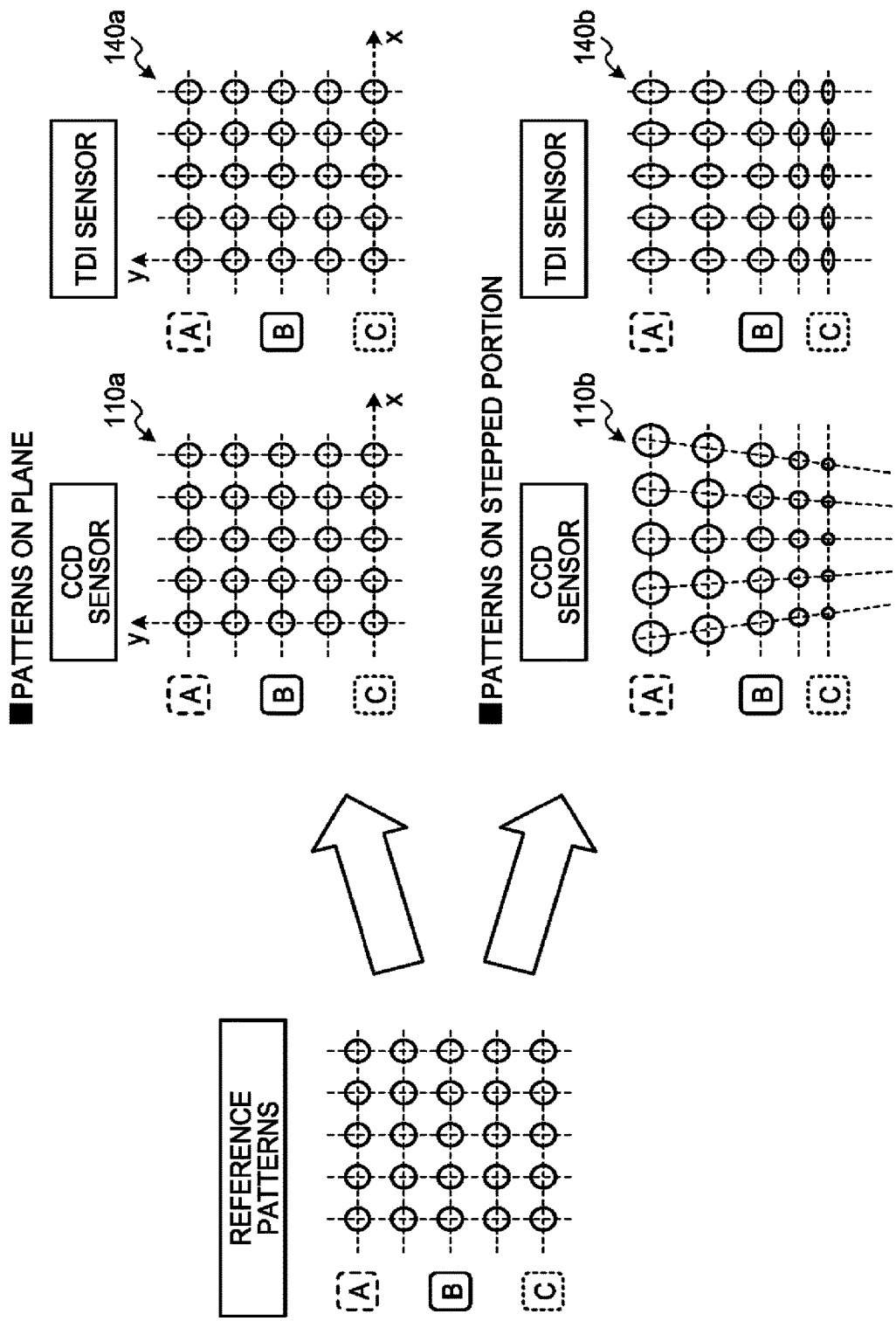

INSPECTION APPARATUS AND INSPECTION METHOD

CROSS-REFERENCE TO RELATED APPLICATIONS

This application is based upon and claims the benefit of priority from Japanese Patent Application No. 2019-050707, filed Mar. 19, 2019, the entire contents of which are incorporated herein by reference.

FIELD

Embodiments described herein relate generally to an inspection apparatus and an inspection method.

BACKGROUND

In conducting an optical inspection on a three-dimensional structural device, there has been known a technique of inspecting patterns on, for example, stepwise portions with a difference in elevation.

According to the known technique, however, it is necessary to acquire a plurality of images while changing a focus value of an optical system depending on heights of an inspection target. This necessity results in not only a long inspection time, but also a difference in sensitivity due to variations in focus for each image acquisition, which may exert influence on inspection accuracy. In addition, a next-generation device includes an increased number of stacked layers. It is therefore obvious that an inspection time becomes longer conspicuously.

BRIEF DESCRIPTION OF THE DRAWINGS

FIG. 1 illustrates an exemplary configuration of an inspection apparatus according to an embodiment;

FIG. 7 illustrates a difference in pixel size owing to a difference in magnification;

FIG. 11B illustrates an exemplary method of adjusting a brightness level according to the embodiment;

FIG. 12B illustrates an exemplary method of adjusting an angle of a lens according to the embodiment;

FIG. 20 illustrates an exemplary image captured by the imaging unit according to the modification of the embodiment.

DETAILED DESCRIPTION

Figure 2A:
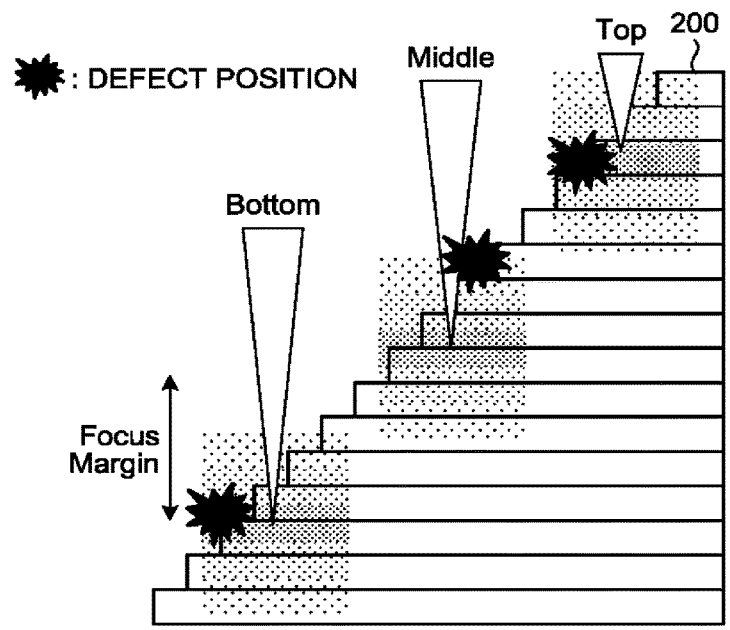
FIG. 2A illustrates Example 1 of an inspection target (a surface of a three-dimensional structure) according to the embodiment.

In general, according to one embodiment, an inspection apparatus includes an irradiation mechanism, an imaging device, a movable mechanism, and a control processor. The irradiation mechanism irradiates an inspection target with light. The imaging device captures an image of the inspection target through a lens. The movable mechanism changes, with respect to an axis extending in an inspection direction for the inspection target, at least one of an angle between the lens and a horizontal plane and an angle between the imaging device and the horizontal plane such that a sample surface of the inspection target, a principal face of the lens, and an imaging face of the imaging device conform to the Scheimpflug principle. The control processor adjusts sensitivities in an image of the sample surface of the inspection target captured by the imaging device at different levels in the image depending on a position in a perpendicular direction to the inspection direction.

Exemplary embodiments of an inspection apparatus and an inspection method will be explained below in detail with reference to the accompanying drawings. The present disclosure is not limited to the following embodiments.

Exemplary Configuration of Inspection Apparatus

FIG. 1 illustrates an exemplary configuration of an inspection apparatus 100 according to an embodiment. The inspection apparatus 100 according to the embodiment includes a light source 1, an illuminating lens 2, a wavelength selective filter 3, an aperture 4, a polarizing filter 5, a half mirror 6, an objective lens 7, a stage 8, a polarizing filter 9, an aperture 10, an image forming lens 11, an imaging unit (the imaging device) 12, an image processor 13, a controller (the control processor) 14, and movable mechanisms 15a to 15i.

In the inspection apparatus 100, an irradiation unit (the irradiation mechanism) is constituted of the light source 1 and an illuminating optical system (the illuminating lens 2, the wavelength selective filter 3, the aperture 4, the polarizing filter 5, the half mirror 6, the objective lens 7).

The light source 1 emits light (inspection light) for use in inspection of an inspection target 200. In the description of the embodiment, the inspection target 200 is a wafer having a three-dimensional structural device.

The illuminating lens 2 collimates the light emitted from the light source 1.

The wavelength selective filter 3 allows passage of light of a wavelength for use in inspection.

The aperture 4 defines a light irradiation method of irradiating the inspection target 200 with the light (e.g., a luminous flux diameter, a numerical aperture, a light amount).

The polarizing filter 5 defines polarization of the light to be applied to the inspection target 200.

The half mirror 6 directs the light irradiated through the polarizing filter 5, toward the inspection target 200. In addition, the half mirror 6 allows passage of the light reflected from the inspection target 200, toward the imaging unit 12.

The objective lens 7 condenses onto the inspection target 200 the light directed to the inspection target 200 by the half mirror 6. In addition, the objective lens 7 collimates the light reflected from the inspection target 200.

The stage 8 is a pedestal on which the inspection target 200 is mounted.

The polarizing filter 9 defines polarization in forming an image on an imaging face of the imaging unit 12 with the light reflected from the inspection target 200.

The aperture 10 defines a light irradiation method in forming an image on the imaging face of the imaging unit 12 with the light reflected from the inspection target 200.

The image forming lens 11 condenses the light reflected from the inspection target 200 onto the imaging face of the imaging unit 12.

The imaging unit 12 captures an image of the inspection target 200 through an image forming optical system (the objective lens 7, the half mirror 6, the polarizing filter 9, the aperture 10, the image forming lens 11). Examples of the imaging unit 12 may include a charge coupled device (CCD) sensor, a time delay integration (TDI) sensor, and the like. The imaging unit 12, which is a CCD sensor, is described in the embodiment. An imaging unit 12, which is a TDI sensor, will be described later in a modification of the embodiment.

The image processor 13 receives a signal from the imaging unit 12, and converts the signal into an image. In addition, the image processor 13 executes, for example, processing of calculating a histogram (distribution) of gray levels from the image, and processing of acquiring a difference between the gray levels.

The controller 14 controls the operation of the entire inspection apparatus 100 in a centralized manner. The controller 14 controls, for example, the movable mechanisms 15a to 15i. The controller 14 adjusts, for example, a sensitivity of an image captured by the imaging unit 12. Details of a method of adjusting a sensitivity of an image will be described later.

The movable mechanism 15a adjusts a position of the wavelength selective filter 3 in accordance with a control signal from the controller 14. The movable mechanism 15b adjusts a position of the aperture 4 in accordance with a control signal from the controller 14. The movable mechanism 15c adjusts a position of the polarizing filter 5 in accordance with a control signal from the controller 14. The movable mechanism 15d adjusts a position of the stage 8 in accordance with a control signal from the controller 14. The movable mechanism 15e adjusts a position of the objective lens 7 in accordance with a control signal from the controller 14. The movable mechanism 15f adjusts a position of the polarizing filter 9 in accordance with a control signal from the controller 14. The movable mechanism 15g adjusts a position of the aperture 10 in accordance with a control signal from the controller 14. The movable mechanism 15h adjusts a position of the image forming lens 11 in accordance with a control signal from the controller 14. The movable mechanism 15i adjusts a position of the imaging unit 12 in accordance with a control signal from the controller 14.

Exemplary Inspection Target

Figure 2B:
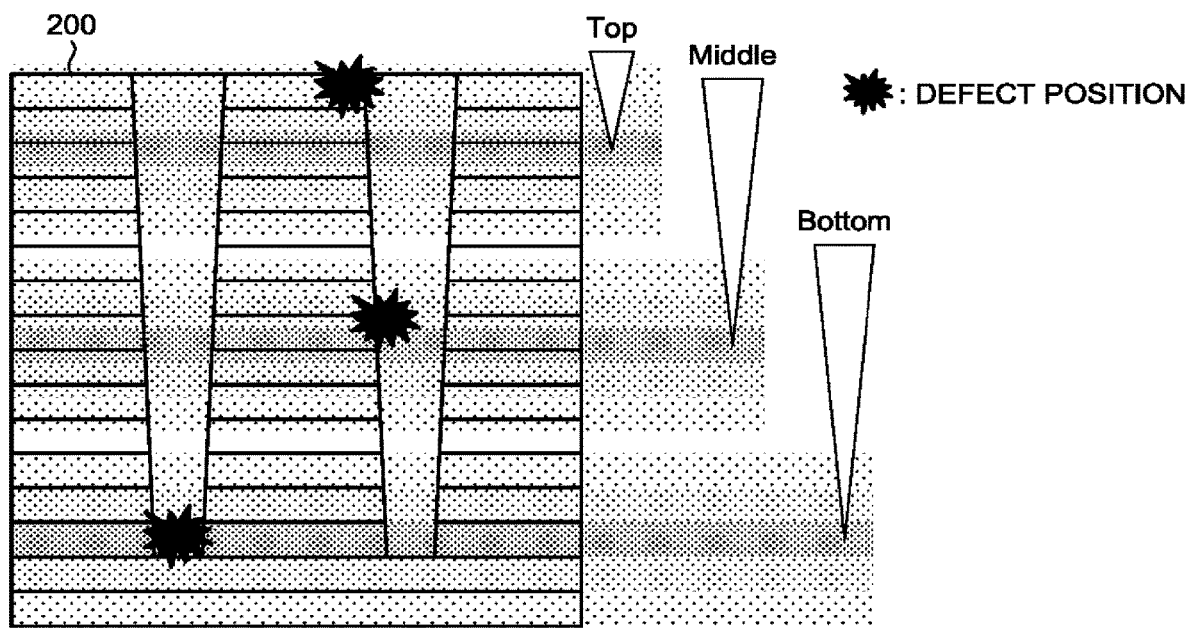
FIG. 2B illustrates Example 2 of the inspection target (an interior of the three-dimensional structure) according to the embodiment.

FIG. 2A illustrates Example 1 of an inspection target (a surface of a three-dimensional structure) according to the embodiment. FIG. 2B illustrates Example 2 of the inspection target (an interior of the three-dimensional structure) according to the embodiment. In inspecting the inspection target 200 having the three-dimensional structural device, for example, a surface defect (see FIG. 2A) and an internal defect (see FIG. 2B) are detected.

According to the conventional technique, it is impossible to simultaneously focus on the top, middle, and bottom of an object. It is therefore necessary to capture plural images while changing a focus value in a depth direction at the sacrifice of inspection throughput.

In the inspection apparatus 100 according to the embodiment, the controller 14 adjusts an angle of the objective lens 7, image forming lens 11, or imaging unit 12 through the movable mechanism 15e, 15h, or 15i such that the top layer to the bottom layer of the inspection target 200 are in focus. Specifically, the controller 14 controls the movable mechanism 15e, 15h, or 15i by using the Scheimpflug principle such that the top to bottom layers of the inspection target 200 are in focus.

Scheimpflug Principle

Figure 3:
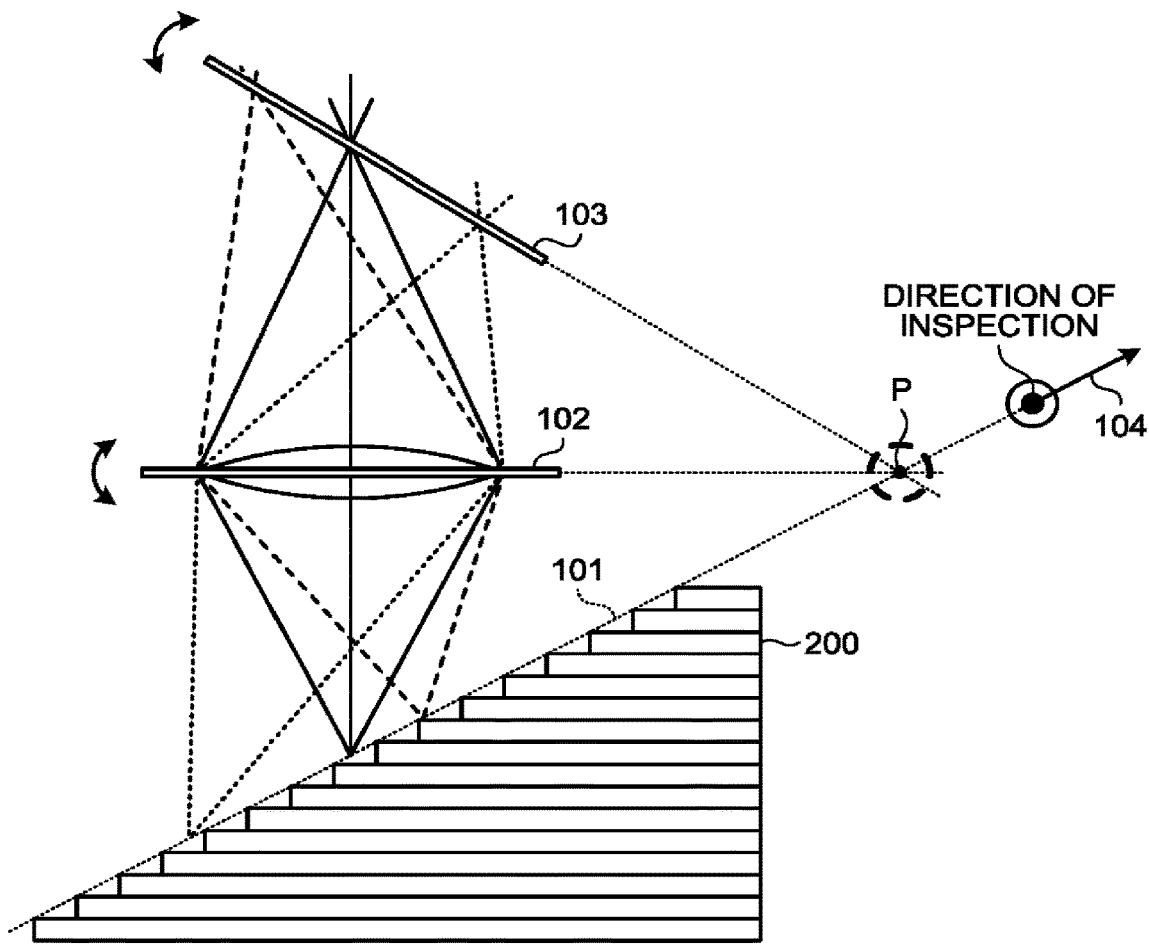
FIG. 3 illustrates an exemplary case of focusing by using the Scheimpflug principle.
Figure 4:
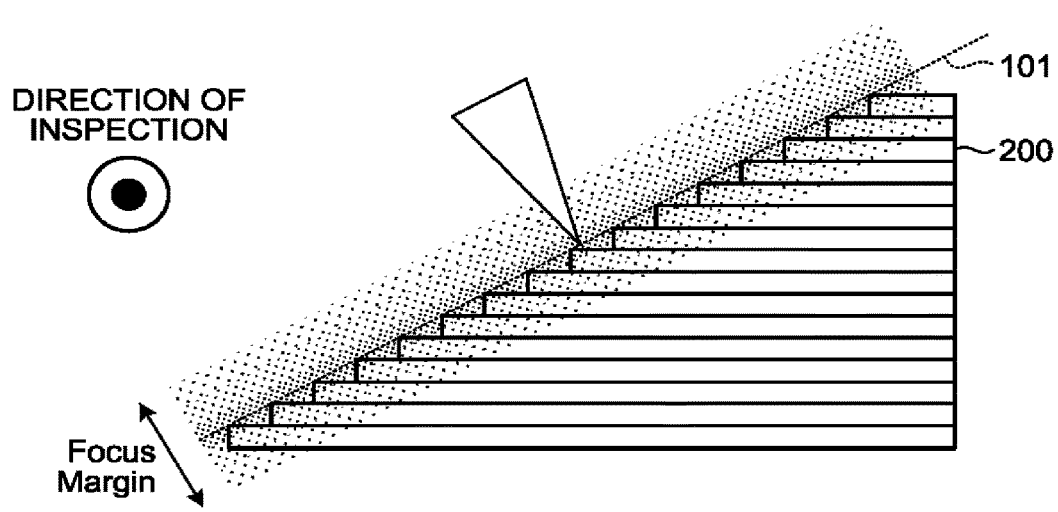
FIG. 4 illustrates an exemplary case of adjusting a focus by using the Scheimpflug principle.

FIG. 3 illustrates an exemplary case of focusing by using the Scheimpflug principle. FIG. 4 illustrates an exemplary case of adjusting a focus by using the Scheimpflug principle. As illustrated in FIG. 3, when a sample surface 101 of the inspection target 200, a principal face 102 of the lens (the objective lens 7 or the image forming lens 11), and an imaging face (detection face) 103 of the imaging unit 12 intersect with one another at a point P, the sample surface 101 as a whole is in focus (see FIG. 4). As illustrated in FIG. 3, for example, even when the sample surface 101 has a difference in elevation in a perpendicular direction 104 to an inspection direction for the sample surface 101, the sample surface 101 as a whole is in focus.

Figure 5:
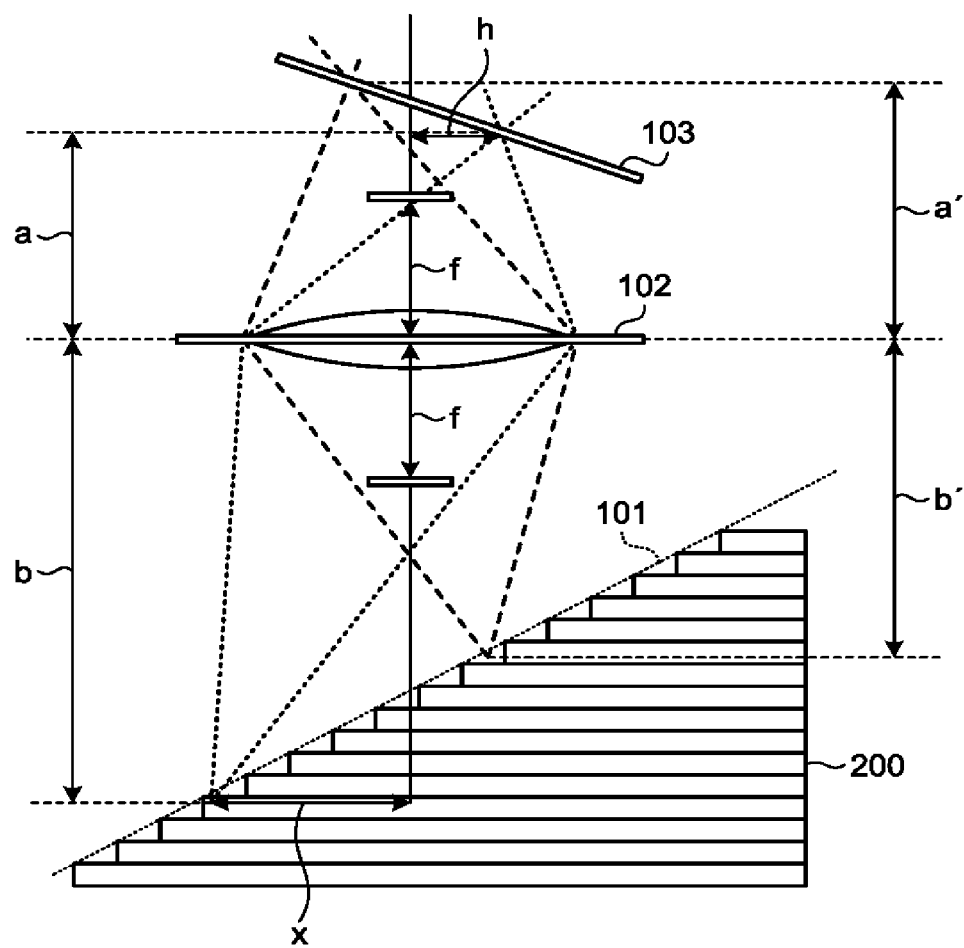
FIG. 5 illustrates a magnification of an image captured by using the Scheimpflug principle.

FIG. 5 illustrates a magnification of an image captured by using the Scheimpflug principle. The following Newtonian image-forming formula (1) and magnification formula (2) are established. In the following formulas, "a" denotes an image distance, "b" denotes an object distance, and "f" denotes a focal distance.

$$1/a + 1/b = 1/f \quad (1)$$

$$h/x = a/b \quad (2)$$

In addition, the following formula (3) is established based on the foregoing formulas (1) and (2).

$$h/x = f/(b-f) \quad (3)$$

As illustrated in FIG. 5, when the image distance a is shorter than the image distance a', and the object distance b is longer than the object distance b', the magnification satisfies a relation of a/b<a'/b'. As to the inspection target 200, therefore, an image of a lower layer is formed to be smaller on the imaging face 103.

Figure 6A:
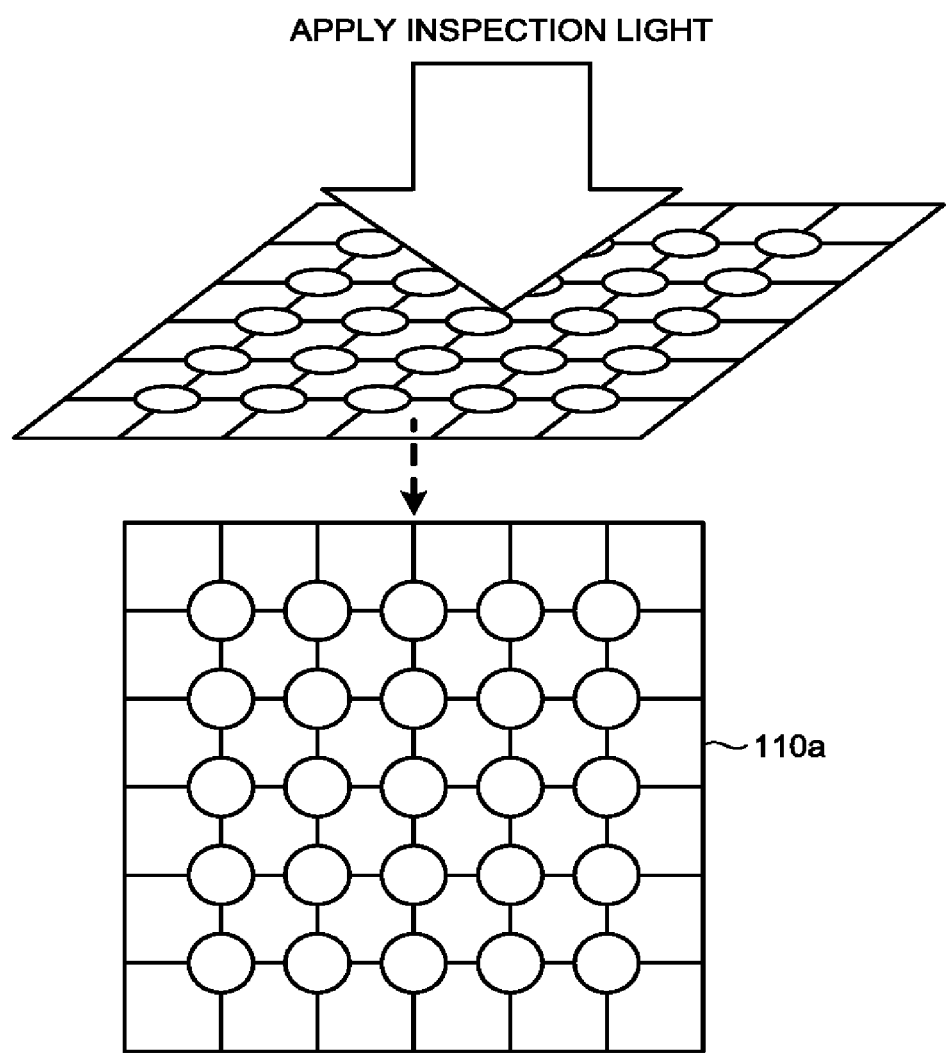
FIG. 6A illustrates an exemplary image of patterns on a plane, where the image is captured from the front side of the patterns.
Figure 6B:
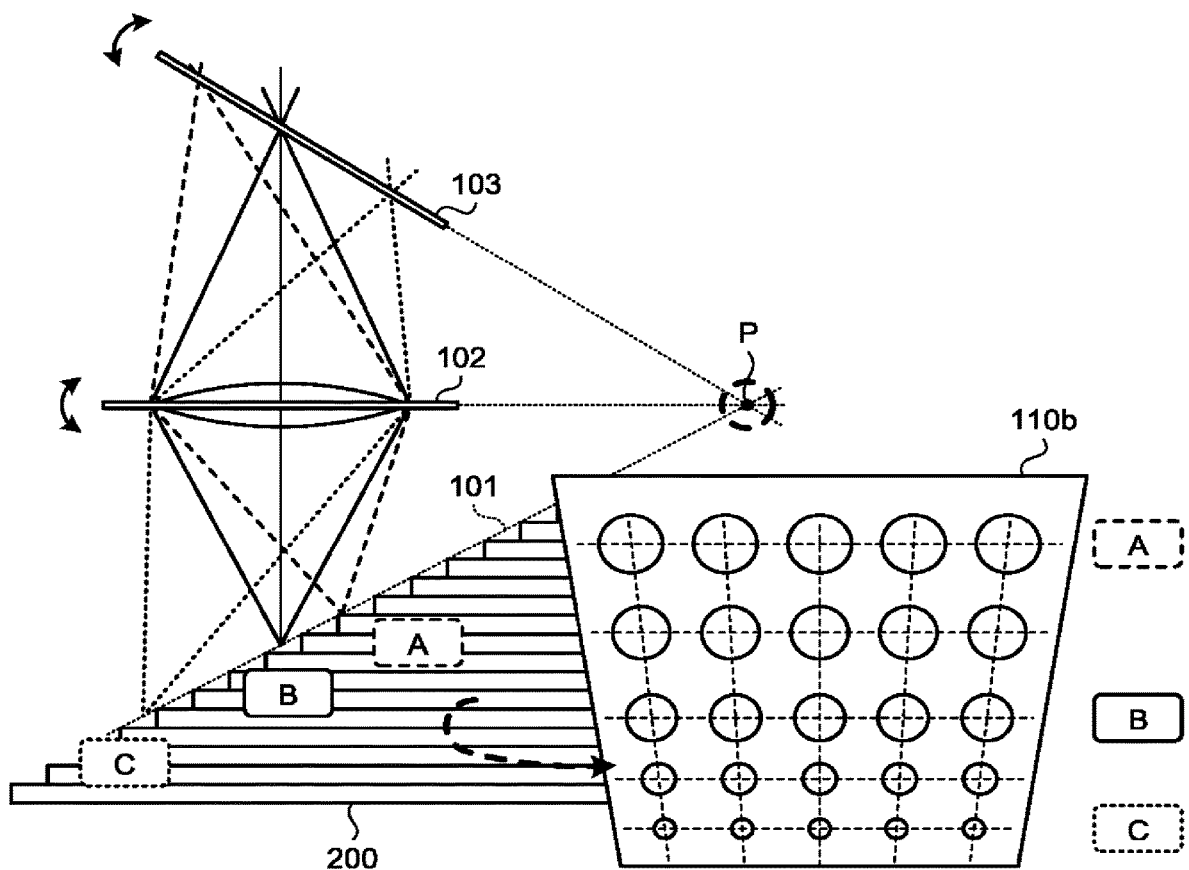
FIG. 6B illustrates an exemplary image of patterns with a difference in elevation, where the image is captured by using the Scheimpflug principle.

FIG. 6A illustrates an exemplary image 110*a* of patterns on a plane, where the image 110*a* is captured from the front side of the patterns. FIG. 6B illustrates an exemplary image 110*b* of patterns with a difference in elevation, where the image is captured by using the Scheimpflug principle. When the image 110*a* of the patterns formed on the plane is captured from the front side of the patterns, the size of the patterns in the image 110*a* is equal to the actual size of the patterns.

When the image 110*b* of the patterns with difference in elevation is captured by using the Scheimpflug principle, the size of the pattern in the image 110*b* at a position A is larger than the actual size of the pattern on the sample surface 101 at a position A. In addition, the size of the pattern in the image 110*b* at a position B is equal to the actual size of the pattern on the sample surface 101 at a position 13. The size of the pattern in the image 110*b* at a position C is smaller than the actual size of the pattern on the sample surface 101 at a position C.

In other words, a pattern on the sample surface 101 at a higher position is projected onto the imaging face 103 such that the size thereof becomes larger than the actual size, and a pattern on the sample surface 101 at a lower position is projected onto the imaging face 103 such that the size thereof becomes smaller than the actual size. Although the image 110*a* captured as illustrated in FIG. 6A has equal magnifications, the image 110*b* captured as illustrated in FIG. 6B has magnification difference.

FIG. 7 illustrates a difference in pixel size owing to a difference in magnification. In forming an image of patterns on a plane, the number of pixels within one hole does not change at any position. In the example illustrated in FIG. 7, each number of pixels in one hole at the positions A to C is four to five.

On the other hand, when patterns being equal in size to the patterns on the above-mentioned plane are formed on the sample surface 101 having the difference in elevation, the image of patterns at the position A is formed on the imaging face 103 such that the size of each pattern becomes larger than the actual size. In the example illustrated in FIG. 7, the number of pixels in one hole at the position A is nine to ten. This is synonymous with the use of a pixel size smaller than the pixel size for use in the patterns on the plane.

The image of patterns at the position B is formed on the imaging face 103 such that the size of each pattern is equal to the actual size. In the example illustrated in FIG. 7, the number of pixels in one hole at the position B is four to five.

The image of patterns at the position C is formed on the imaging face 103 such that the size of each pattern becomes smaller than the actual size. In the example illustrated in FIG. 7, the number of pixels in one hole at the position C is one to two. This is synonymous with the use of a pixel size larger than the pixel size for use in the patterns on the plane.

Inspection Method

Figure 8A:
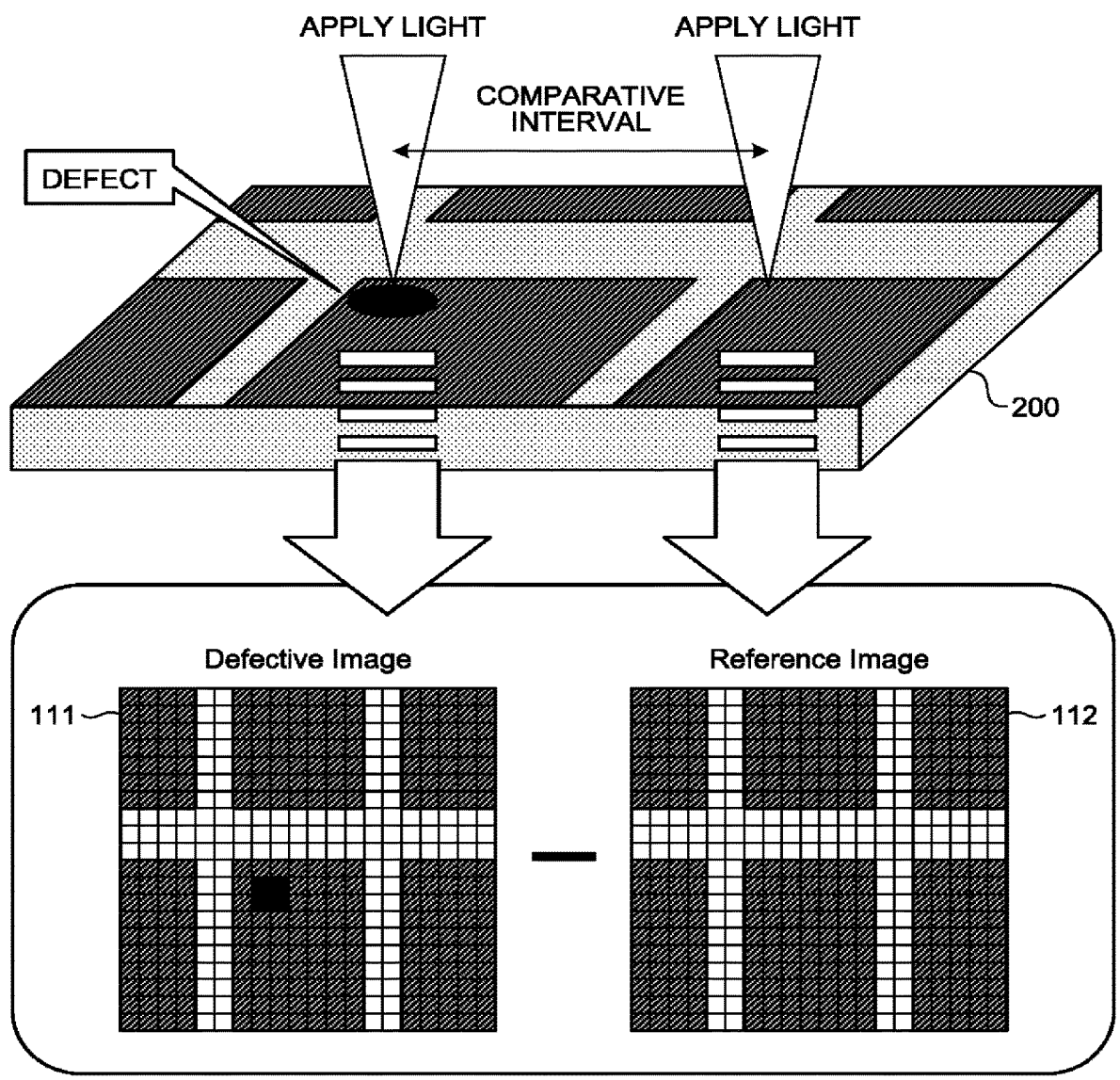
FIG. 8A illustrates an exemplary inspection method of the inspection apparatus according to the embodiment.
Figure 8B:
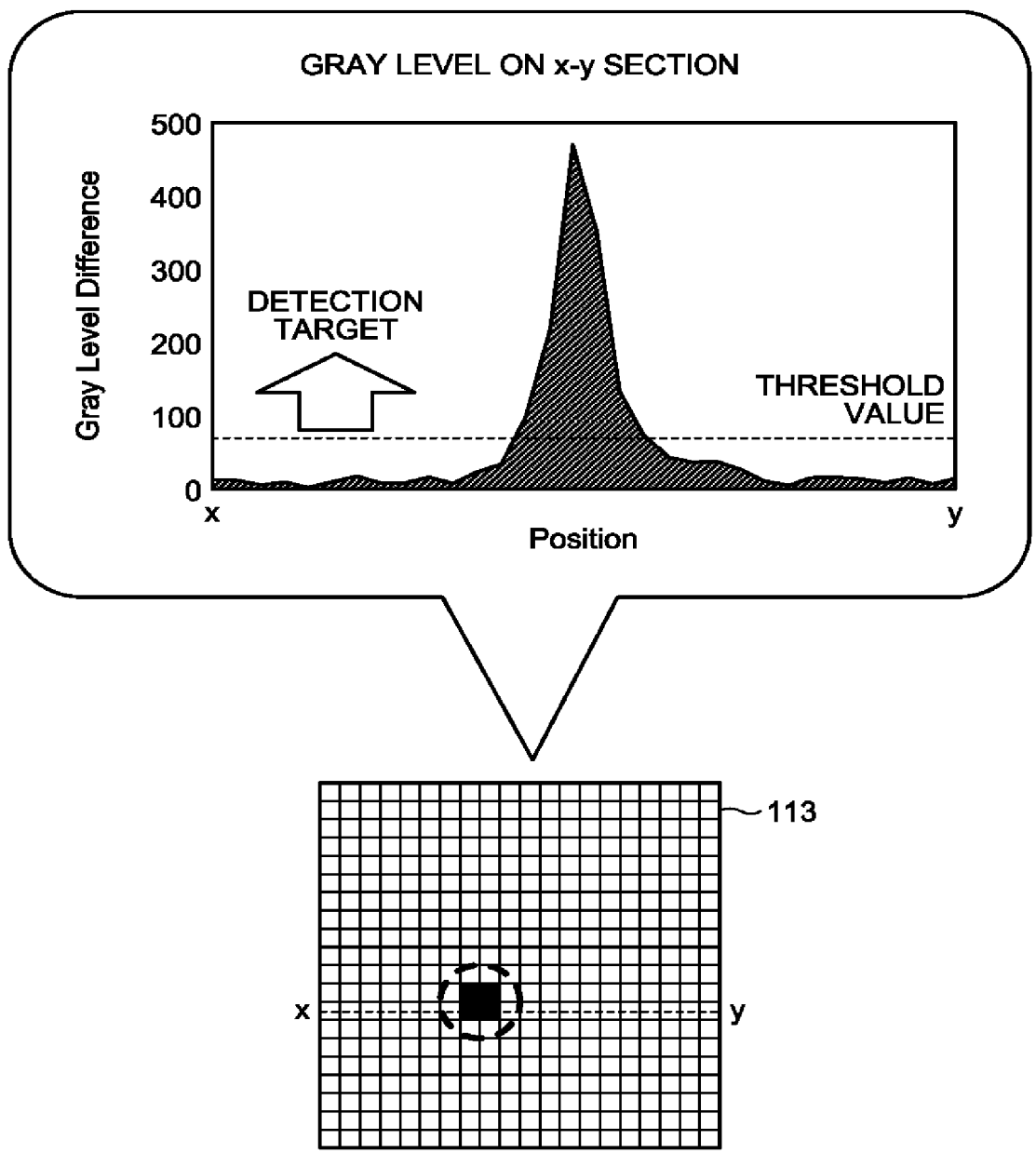
FIG. 8B illustrates a detection example of a defect by the inspection apparatus according to the embodiment.

FIG. 8A illustrates an exemplary inspection method of the inspection apparatus 100 according to the embodiment. FIG. 8B illustrates a detection example of a defect by the inspection apparatus 100 according to the embodiment. The inspection apparatus 100 inspects the inspection target 200 by comparison (e.g., die-to-die comparison and array comparison) between images captured by the imaging unit 12.

Specifically, the image processor 13 acquires, from an image captured by the imaging unit 12, a detection (defective) image 111 including the patterns on the inspection target and a reference image 112 including the patterns corresponding to the patterns in the detection image 111 and to be compared with the patterns in the detection image 111. Next, the image processor 13 acquires a differential image 113 indicating a difference between the detection image 111 and the reference image 112. The controller 14 determines whether a difference between the patterns in the differential image 113 is larger than a threshold value, thereby detecting a defect on the patterns.

In the example of the embodiment, the difference between the patterns is represented by a difference in gray level calculated from the image 110*b*. For this reason, the accuracy of an image to be captured by the imaging unit 12 exerts influence on a result of the inspection. The inspection apparatus 100 according to the embodiment acquires images at a time in a manner that the sample surface 101 of the inspection target 200, the principal face 102 of the lens, and the imaging face 103 of the imaging unit 12 conform to the Scheimpflug principle. According to the embodiment, this configuration causes no difference in sensitivity due to a variation in focus for each image acquisition, as compared with the conventional case of acquiring images while changing a focus value of an optical system depending on the height of an inspection target. The configuration according to the embodiment is therefore capable of improving inspection accuracy.

Adjustment of Comparison Interval

Figure 9A:
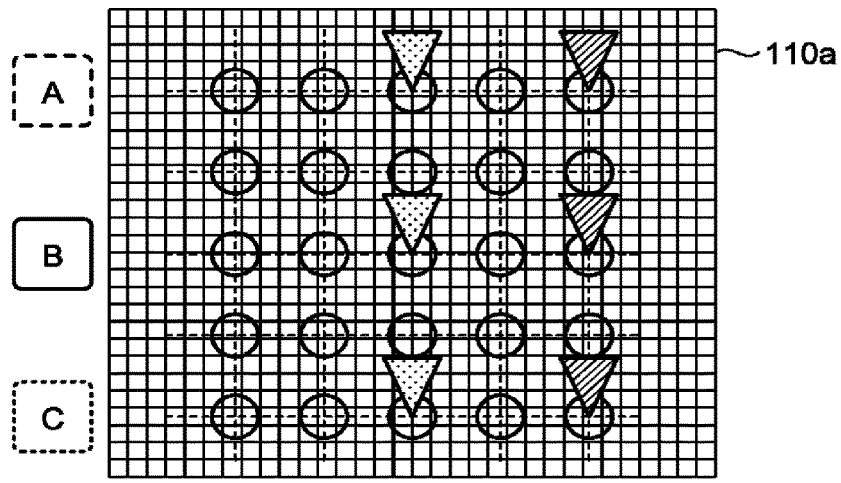
FIG. 9A illustrates an exemplary method of adjusting comparison interval according to the embodiment.
Figure 9B:
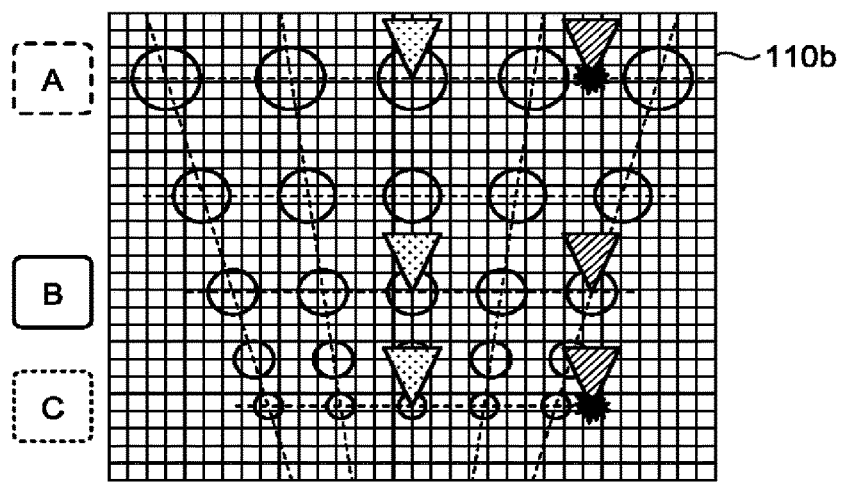
FIG. 9B illustrates an exemplary method of adjusting comparison interval according to the embodiment.
Figure 9C:
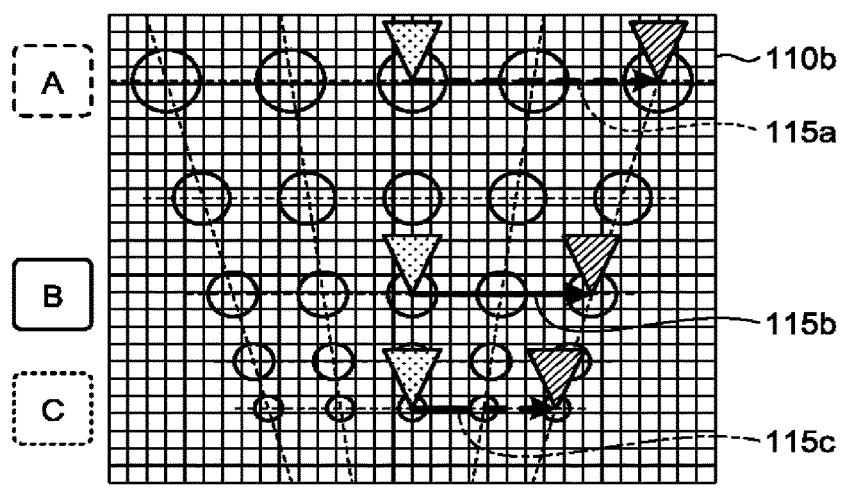
FIG. 9C illustrates an exemplary method of adjusting comparison interval according to the embodiment.

FIGS. 9A to 9C each illustrate an exemplary method of adjusting comparison interval according to the embodiment. As illustrated in FIG. 9A, in the image 110*a* of the patterns on the plane, the patterns at the positions A to C are comparable at equal comparison interval.

On the other hand, the image 110*b* of the patterns on the sample surface 101 with the difference in elevation has difference in magnification. As illustrated in FIG. 9B, if comparison intervals are decided based on the patterns on the plane, the pattern at the position A cannot be compared with the pattern at the position C, thereby hindering correct inspection. The controller 14 according to the embodiment changes comparison intervals 115*a* to 115*c* in accordance with the magnification difference on the image 110*b*, as illustrated in FIG. 9C. Specifically, the controller 14 changes the comparison interval for comparison between the patterns, which is performed by obtaining the difference between the patterns on the image 110*b*, depending on the positions of those patterns in the perpendicular direction 104 to the inspection direction of the image 110*b*.

Adjustment of Brightness Levels

Figure 10:
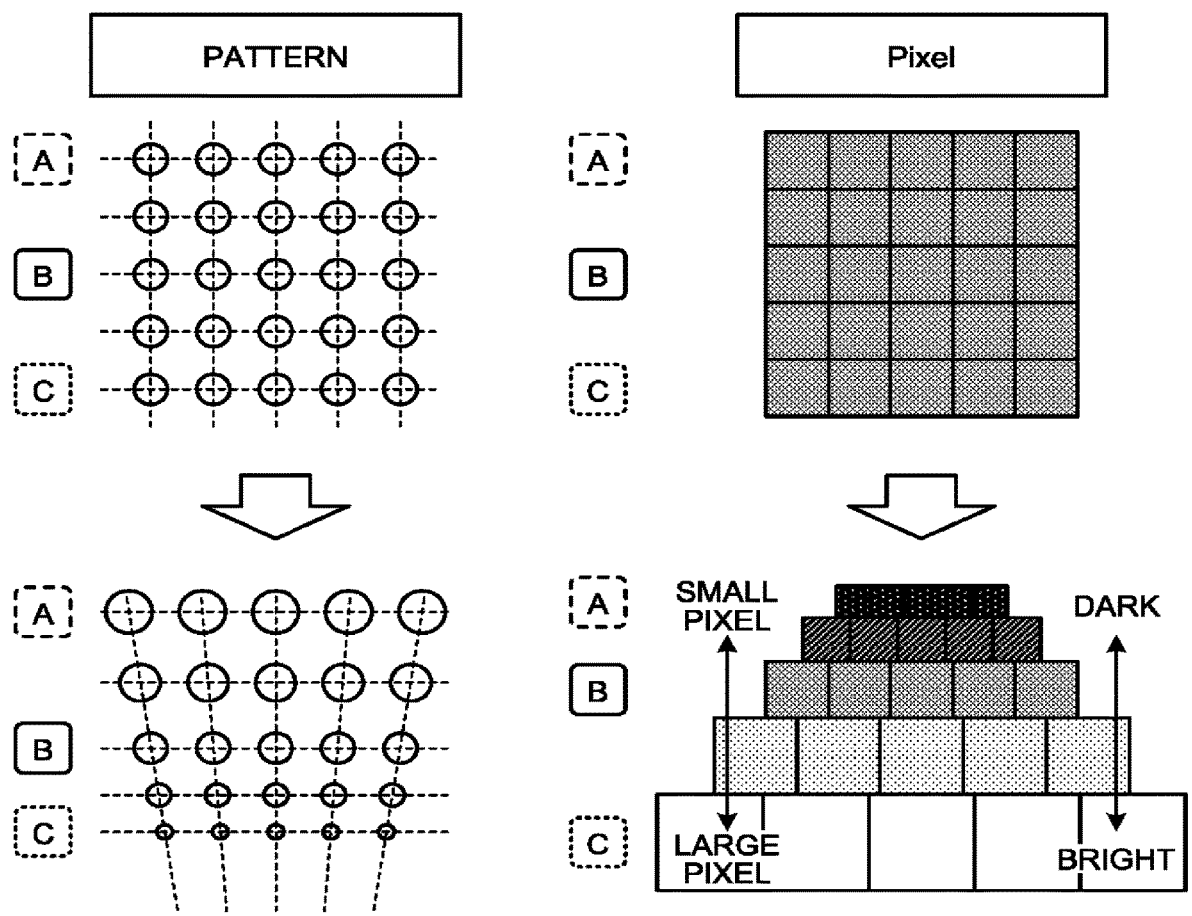
FIG. 10 illustrates a difference in brightness level according to a magnification.

FIG. 10 illustrates a difference in brightness level according to a magnification. The upper part of FIG. 10 represents the case where the magnifications are equal over the entire regions of the image. The pixel sizes are uniform when the magnifications are equal all over the image, so that the brightness levels in the image are also uniform. On the other hand, the lower part of FIG. 10 represents the case where the magnifications are different. As a magnification is larger and a pixel size is smaller, an amount of light to be irradiated per pixel is reduced, so that the corresponding region in the image becomes dark. In other words, the sight (i.e., brightness level) of the image is different depending on a position among the positions A to C.

Figure 11A:
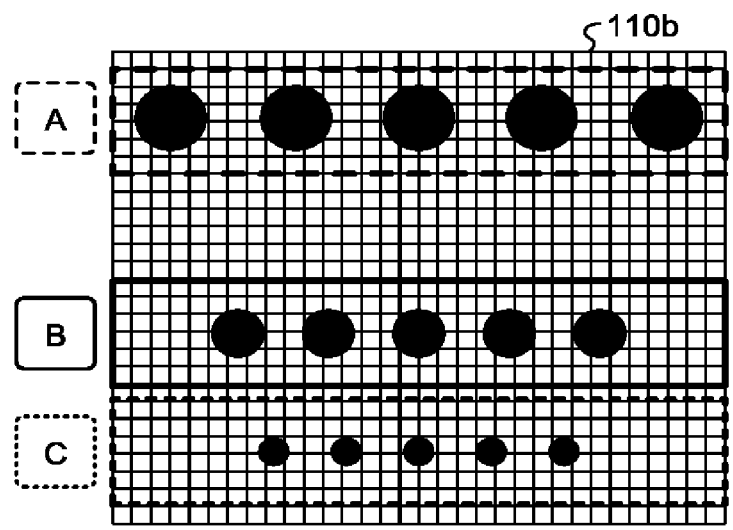
FIG. 11A illustrates an exemplary method of adjusting a brightness level according to the embodiment.

FIGS. 11A and 11B each illustrate an exemplary method of adjusting the brightness levels according to the embodiment. In FIG. 11A, only the patterns at the positions A to C are depicted for simplification of illustration. As illustrated in the upper part of FIG. 11B, the brightness levels in the image 110b are different in accordance with difference in magnification. Specifically, since a ratio of holes in a pattern is small in order of position A<position B<position C, a peak at the bright region other than the holes is high in order of position A<position B<position C. Hence, the controller 14 according to the embodiment shifts the brightness levels in the image 110b so as to gain a histogram (distribution) of gray levels shown in the lower part of FIG. 11B, for example. Based on, for example, the position B at which the magnification does not vary, the controller 14 increases the brightness level at the position A at which the magnification is larger than the magnification at the position B, and decreases the brightness level at the position C at which the magnification is smaller than the magnification at the position B. In other words, the controller 14 shifts the brightness levels in the image 110b depending on the position in the perpendicular direction 104 to the inspection direction for the image 110b, thereby adjusting sensitivities in the image 110b. With this configuration, a difference in brightness level is narrowed in the image 110b, so that the inspection sensitivities are made uniform within the image 110b even when the magnifications are different in the image 110b.

Alternatively, the controller 14 may change, based on the positions of the patterns on the inspection target, a threshold value level applied when comparing the difference between the patterns in the differential image 113 with the threshold value as illustrated in FIG. 8B without changing the brightness levels in the regions of the image 110b in accordance with the difference in magnification in the image 110b. Specifically, in comparing the difference in gray level equivalent to the difference between the patterns with the threshold value, the controller 14 decreases the threshold value level at the position A and increases the threshold value level at the position C, depending on the position in the perpendicular direction 104 to the inspection direction for the image 110b, thereby adjusting the sensitivities in the image 110b. With this configuration, as in the case of shifting the brightness levels in the regions of the image 110b, the inspection sensitivities are made uniform within the image 110b even when the magnifications are different in the image 110b.

Adjustment of Angle

Figure 12A:
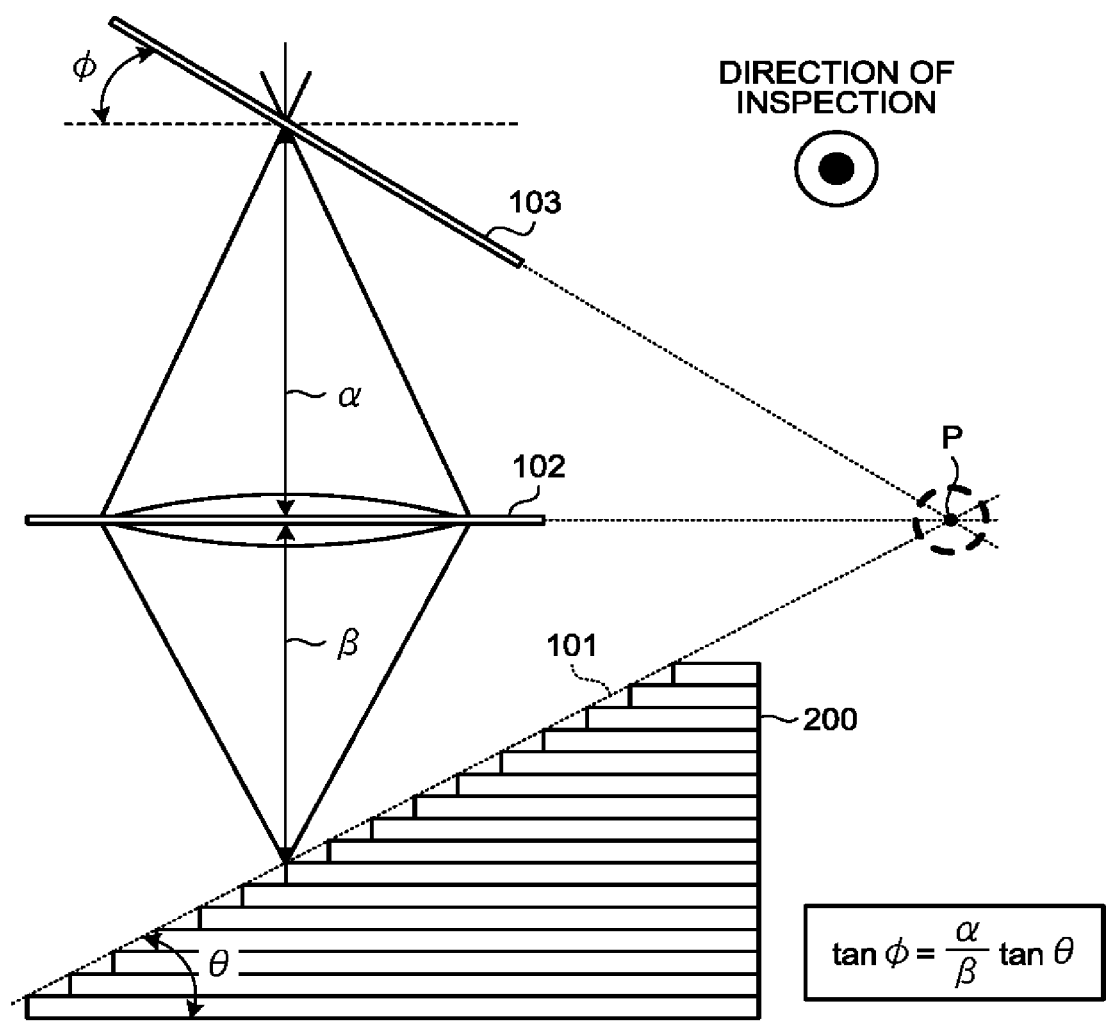
FIG. 12A illustrates an exemplary method of adjusting an angle of an imaging unit according to the embodiment.

FIG. 12A illustrates an exemplary method of adjusting an angle ϕ of the imaging unit 12 according to the embodiment. The controller 14 controls the movable mechanism 15i, based on design data used for designing the inspection target 200 and also based on the Scheimpflug principle, thereby adjusting (initializing) the angle ϕ of the imaging face 103 of the imaging unit 12. The design data contains, for example, an angle θ of the sample surface 101 of the inspection target 200, and a height of the sample surface 101.

The controller 14 may adjust an angle of a lens (the objective lens 7 or the image forming lens 11) instead of adjusting the imaging unit 12.

FIG. 12B illustrates an exemplary method of adjusting the angle of the lens (the objective lens 7 or the image forming lens 11) according to the embodiment. The controller 14 controls the movable mechanism 15e or 15h, thereby adjusting the angle ϕ of the principal face 102 of the objective lens 7 or image forming lens 11 based on the foregoing design data and the Scheimpflug principle.

The controller 14 may adjust at least one of the angle ϕ of the imaging face 103 of the imaging unit 12, the angle ϕ of the principal face 102 of the objective lens 7, and the angle ϕ of the principal face 102 of the image forming lens 11.

Figure 13:
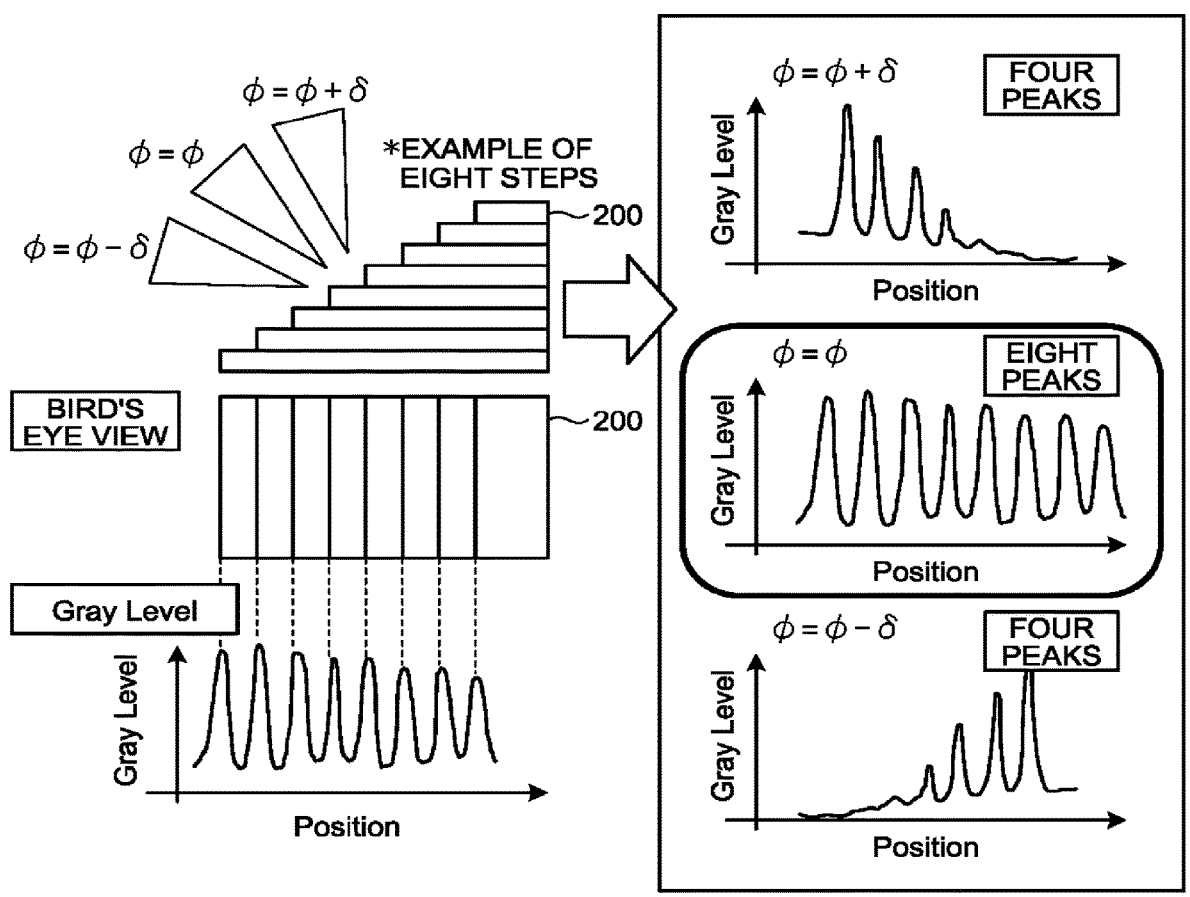
FIG. 13 illustrates an exemplary method of readjusting the angle of the lens or the angle of the imaging unit according to the embodiment.

FIG. 13 illustrates an exemplary method of readjusting the angle ϕ of the lens (the objective lens 7 or the image forming lens 11) or the angle ϕ of the imaging unit 12 according to the embodiment. The exemplary readjustment method illustrated in FIG. 13 can be implemented when the sample surface 101 has stepwise portions or the like. The controller 14 changes the angle ϕ initialized by the adjustment method illustrated in FIG. 12A or 12B within a range from ϕ−δ to ϕ+δ to readjust the angle ϕ such that the gray levels reach their peaks at the vertexes of the stepwise portions of the sample surface 101. In the example illustrated in FIG. 13, the inspection target 200 has eight steps. Therefore, when each step on the sample surface 101 of the inspection target 200 is focused, the gray levels calculated from the captured image have eight peaks. Thus, the controller 14 changes the initialized angle ϕ within the range from ϕ−δ to ϕ+δ to readjust the angle ϕ to an angle ϕ at which a gray level distribution having eight peaks is acquired.

Next, a description will be given of an exemplary operation of the inspection apparatus 100 according to the embodiment with reference to a flowchart.

Figure 14:
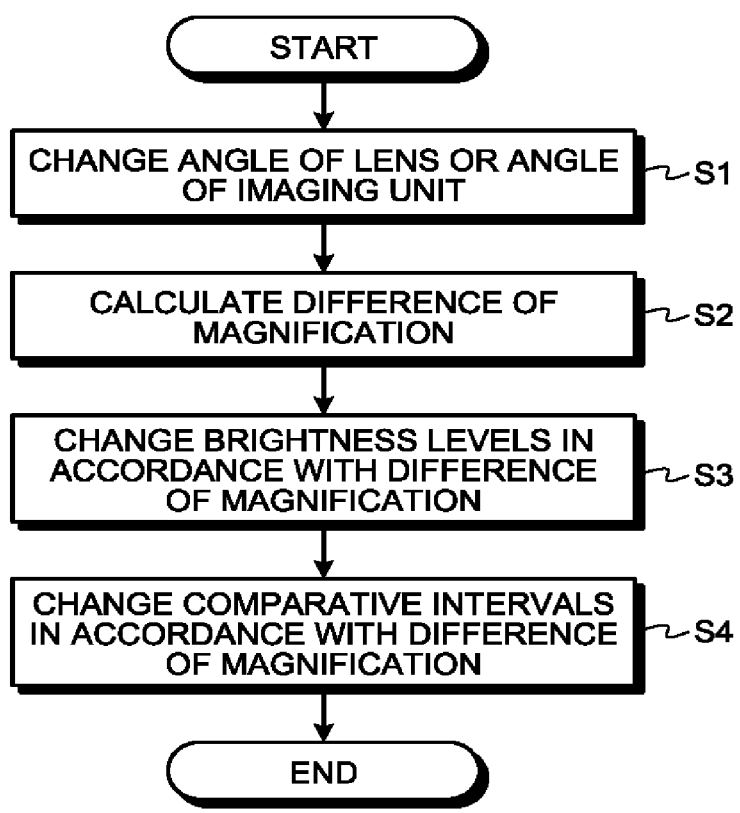
FIG. 14 is a flowchart of an exemplary method of adjusting the inspection apparatus according to the embodiment.

FIG. 14 is a flowchart of an exemplary method of adjusting the inspection apparatus 100 according to the embodiment. First, the controller 14 changes the angle ϕ of the lens (the objective lens 7 or the image forming lens 11) or the angle ϕ of the imaging unit 12 (step S1). Specifically, the controller 14 initializes the angle ϕ by the adjustment method illustrated in FIG. 12A or 12B, and readjusts the angle ϕ by the readjustment method illustrated in FIG. 13.

The controller 14 calculates, based on the angle ϕ changed in the processing of step S1, the difference in magnification within the image among the heights of the sample surface 101 (step S2).

The controller 14 shifts the brightness levels in the regions of the image in accordance with the difference in magnification calculated in the processing of step S2 (step S3). Specifically, the controller 14 adjusts the sensitivities in the image of the sample surface 101, which is captured by the imaging unit 12, at the different levels in the image depending on the position in the perpendicular direction 104 to the inspection direction for the image. For example, the controller 14 adjusts the brightness levels such that the distribution of the gray levels is shifted as illustrated in the lower part of FIG. 11B.

The controller 14 changes the comparison interval (see FIG. 9C) in accordance with the difference in magnification calculated in the processing of step S2 (step S4).

Figure 15:
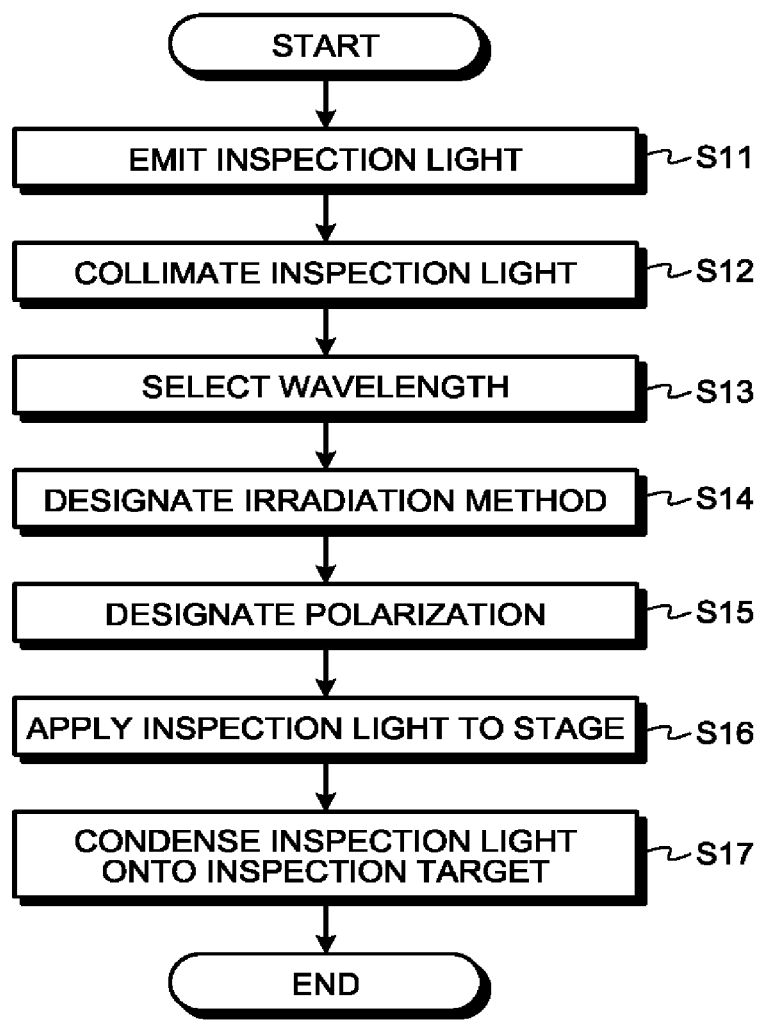
FIG. 15 is a flowchart of an exemplary method of applying inspection light according to the embodiment.

FIG. 15 is a flowchart of an exemplary method of applying inspection light according to the embodiment. First, the light source 1 emits inspection light (step S11). The illuminating lens 2 collimates the inspection light emitted in the processing of step S11 (step S12). The wavelength selective filter 3 allows passage of light of a wavelength for use in inspection (step S13). The aperture 4 decides a light irradiation method of irradiating the inspection target 200 with the light (step S14). The polarizing filter 5 decides polarization of the light to be applied to the inspection target 200 (step S15). The half mirror 6 directs the inspection light toward the stage 8 on which the inspection target 200 is mounted (step S16). The objective lens 7 condenses, onto the inspection target 200, the inspection light directed to the inspection target 200 in the processing of step S16 (step S17).

Figure 16:
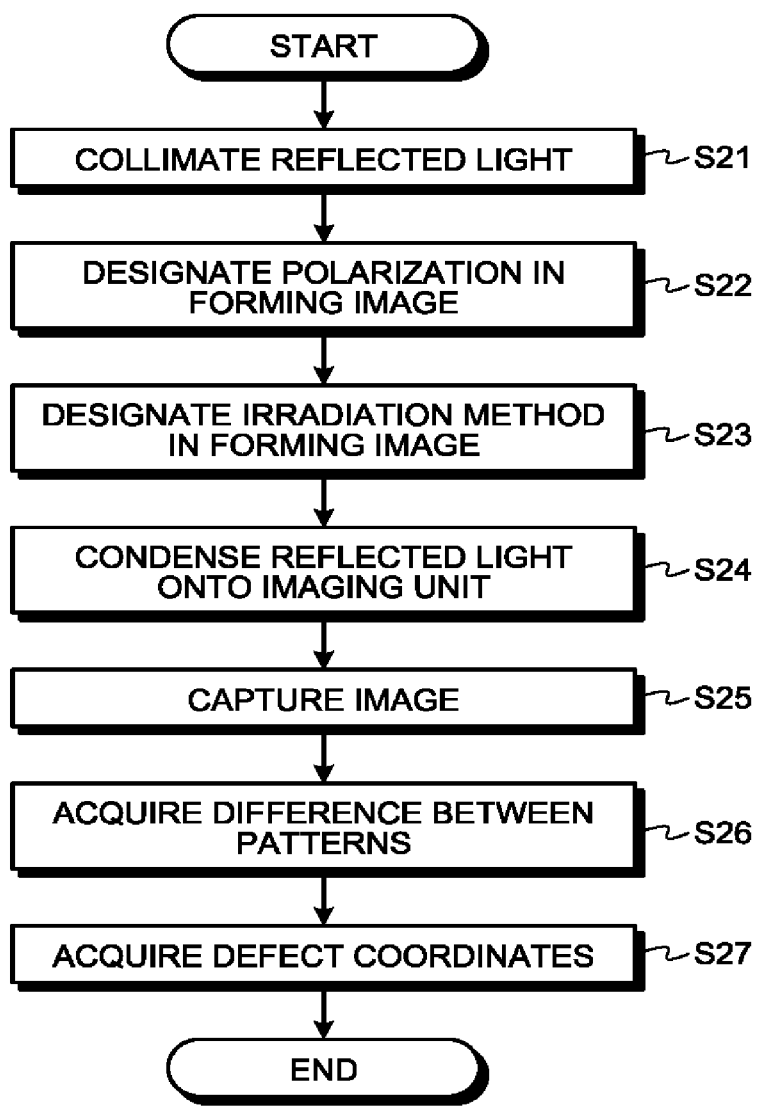
FIG. 16 is a flowchart of an exemplary method of inspecting reflected light according to the embodiment.

FIG. 16 is a flowchart of an exemplary method of inspecting reflected light according to the embodiment. First, the objective lens 7 collimates the light reflected from the inspection target 200 (step S21). The polarizing filter 9 decides polarization in forming an image on the imaging face 103 of the imaging unit 12 with the reflected light (step S22). The aperture 10 decides a light irradiation method in forming the image on the imaging face 103 of the imaging unit 12 with the reflected light (step S23).

The image forming lens 11 condenses the reflected light onto the imaging face 103 of the imaging unit 12 (step S24). The imaging unit 12 captures an image 110b of the inspection target 200 (step S25). The image processor 13 acquires a difference between patterns in the image 110h captured in the processing of step S25 such that the patterns are subjected to comparison at the comparison interval 115a to 115c (step S26). When the difference between the patterns acquired in the processing of step S26 is larger than the threshold value, the controller 14 acquires coordinates indicating the position of the relevant pattern as defect coordinates (step S27).

The inspection apparatus 100 according to the embodiment performs the processes illustrated in the flowcharts of FIGS. 15 and 16 on the entire inspection target 200 (the entire wafer in the embodiment), thereby acquiring defect coordinates indicating a position of a defect on the inspection target 200.

As described above, in the inspection apparatus 100 according to the embodiment, the irradiation unit (the light source 1 and the illuminating optical system) irradiates the inspection target 200 with light. The imaging unit 12 captures an image of the inspection target 200 through the lenses (the objective lens 7 and the image forming lens 11 in the embodiment). The movable mechanism 15i changes the angle (elevation angle) ϕ between the imaging unit 12 and the horizontal plane with respect to the axis extending in the inspection direction for the inspection target 200 such that the sample surface 101 of the inspection target 200, the principal face 102 of the lens, and the imaging face 103 of the imaging unit 12 conform to the Scheimpflug principle. The controller 14 adjusts the sensitivities in the image 110b of the sample surface 101, which is captured by the imaging unit 12, at the different levels in the image 110b depending on the position in the perpendicular direction 104 to the inspection direction for the image 110b.

With this configuration of the inspection apparatus 100 according to the embodiment, there is no necessity to acquire images while changing a focus value of an optical system depending on the height of the inspection target 200. Therefore, it is capable of improving inspection accuracy and reduction in inspection time.

Modification of Embodiment

A description will be given of a modification of the embodiment. In the following description of the modification, a description similar to that of the embodiment is omitted. In the modification, a description will be given of a case where the imaging unit 12 is a TDI sensor.

Figure 17:
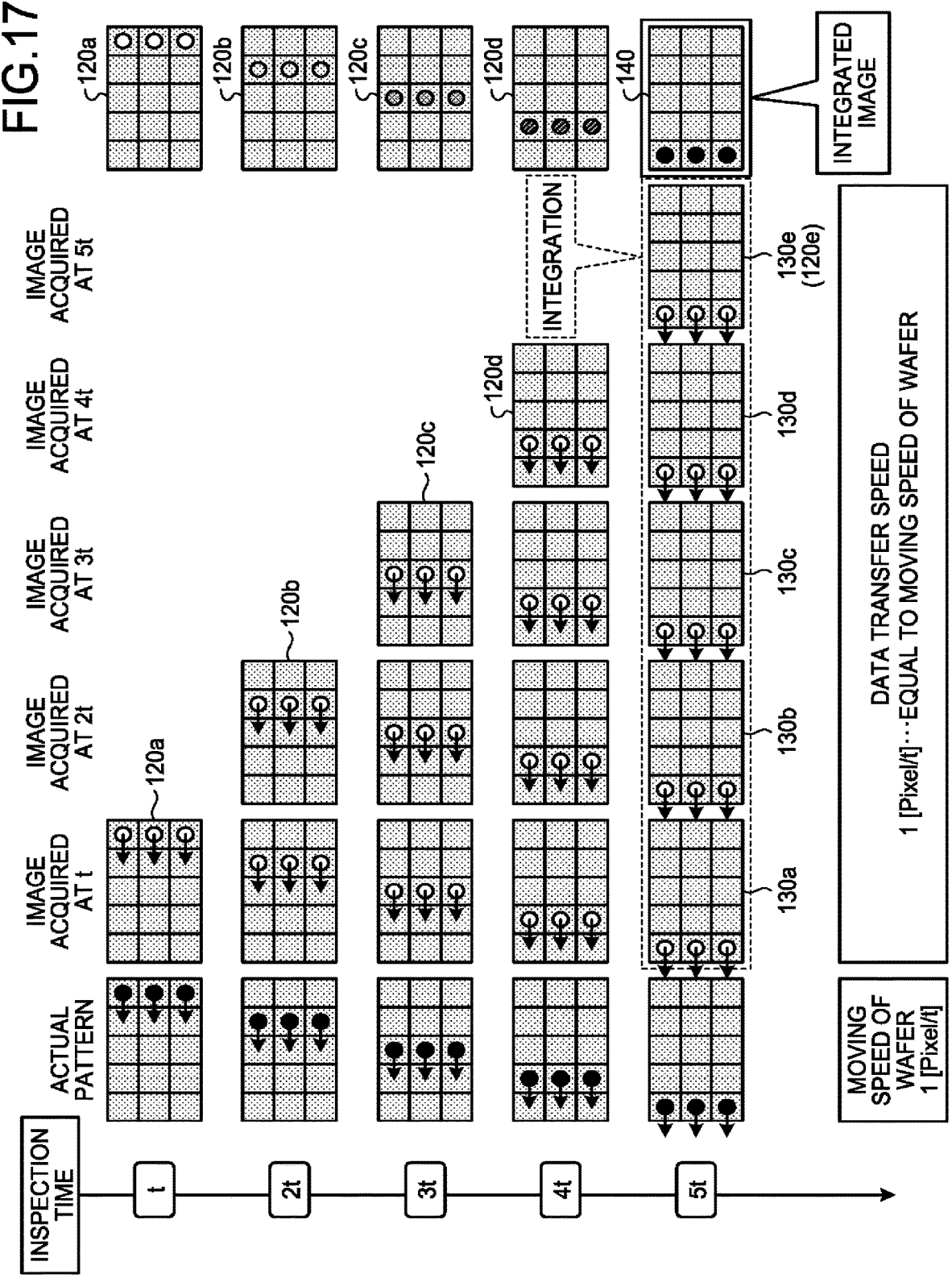
FIG. 17 illustrates an exemplary operation of an imaging unit (a TDI sensor) according to a modification of the embodiment.

FIG. 17 illustrates an exemplary operation of an imaging unit 12 (TDI sensor) according to the modification of the embodiment. In the TDI sensor, pieces of data acquired at pixels of an image initially captured are transferred to pixels of an image captured next at the same speed as a moving speed of the inspection target 200 (wafer). In the example illustrated in FIG. 17, pieces of data acquired at pixels in images 120a to 120e are transferred to pixels in images 130a to 130e, and those pieces of data are integrated, so that an integrated image 140 is acquired. The TDI sensor repeatedly performs this integration by the number of pixels, thereby acquiring an image with less noise. However, when the moving speed of the inspection target 200 is different from the data transfer speed, it is impossible to integrate images of identical patterns.

Figure 18:
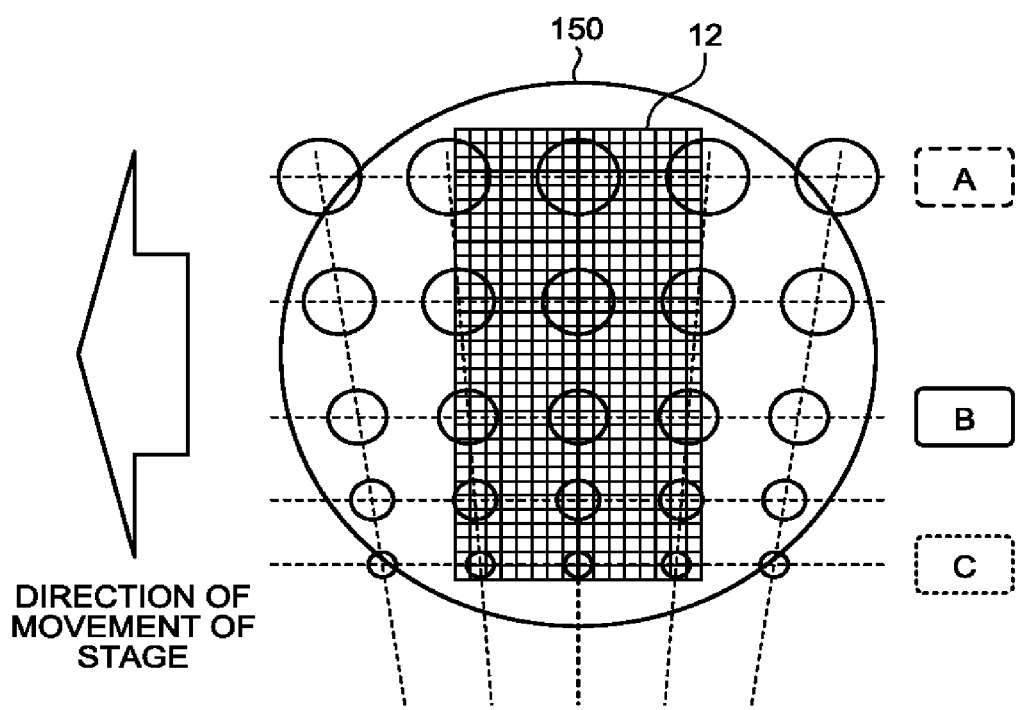
FIG. 18 illustrates a case of capturing an image of a sample surface with a difference in elevation by the imaging unit according to the modification of the embodiment.

FIG. 18 illustrates a case of capturing an image of the sample surface 101 with the difference in elevation by the imaging unit 12 according to the modification of the embodiment. In capturing the image of the sample surface 101 having difference in elevation, an image of the patterns is formed on the imaging unit 12 in a state where the magnifications are different within a field of view included in a spot light 150. Since the patterns are different in size at the positions A to C in the height direction of the sample surface 101, the images of the patterns pass the imaging unit 12 at different speeds in accordance with the positions A to C. The image processor 13 according to the modification of the embodiment correctly acquires the integrated image 140 by adjusting the data transfer speeds based on the magnifications (at the positions A to C).

Figure 19:
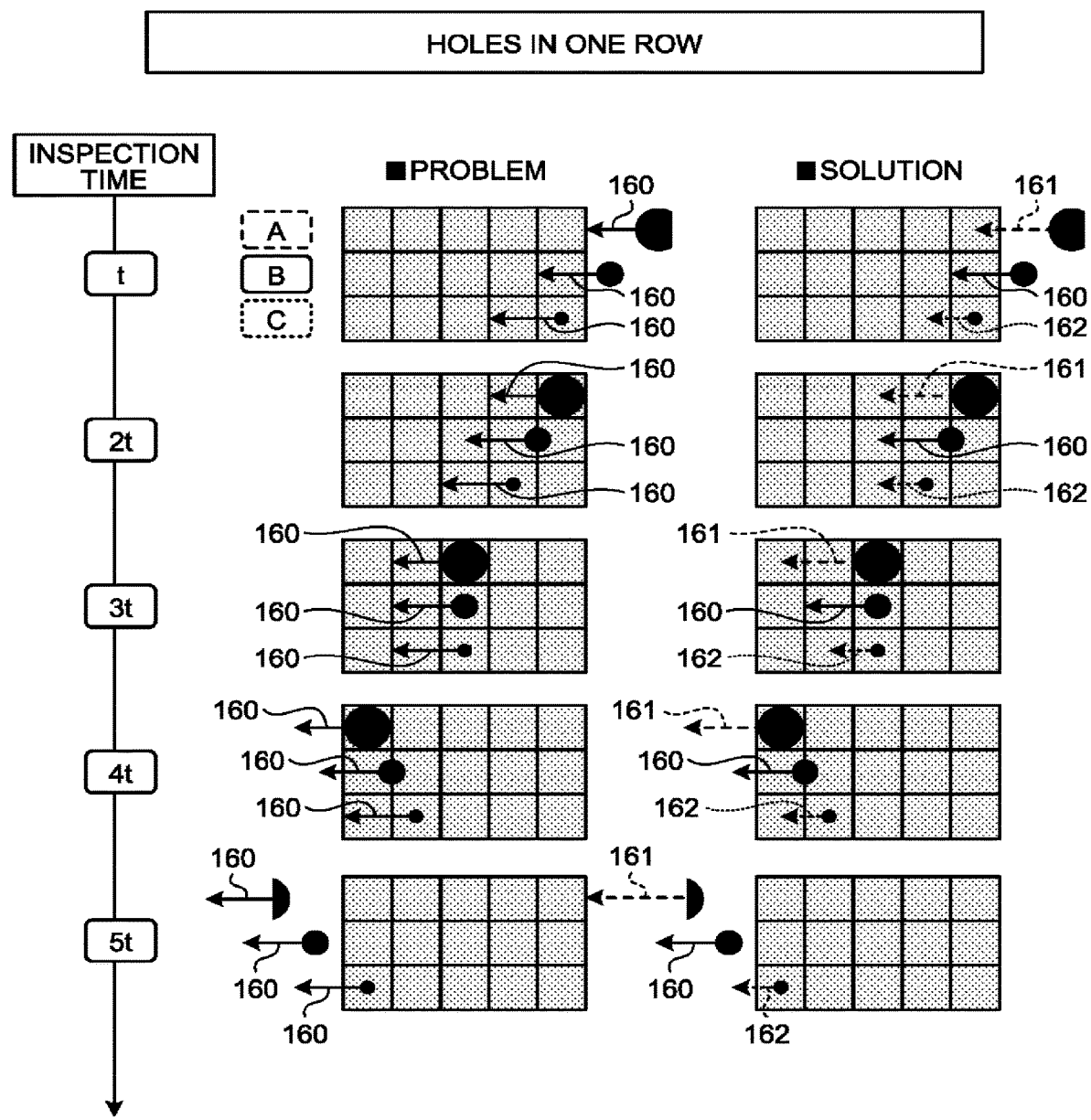
FIG. 19 illustrates a transfer speed in integrating an image of the sample surface with the difference in elevation, the image being captured by the imaging unit according to the modification of the embodiment.

FIG. 19 illustrates transfer speeds in integrating images of the sample surface 101 with the difference in elevation, where the images is captured by the imaging unit 12 according to the modification of the embodiment. As illustrated in the left side of FIG. 19, when data transfer speeds 160 are equal at the positions A to C, the integrated image 140 cannot be correctly acquired because the images of the patterns at the positions A to C pass the imaging unit 12 at different speeds. In view of this point, the image processor 13 according to the modification of the embodiment changes the data transfer speeds 160 in integrating pieces of data indicating the patterns in accordance with a difference in magnification within the image 120, which is caused by a change in angle between the imaging unit 12 and the horizontal plane. Specifically, as illustrated in the right side of FIG. 19, a data transfer speed 161 at the position A is made faster than a data transfer speed 160 at the position B, and a data transfer speed 162 at the position C is made slower than the data transfer speed 160 at the position B. In other words, the controller 14 changes the data transfer speeds in integrating by the TDI sensor the pieces of data indicating the patterns, depending on the position of each patterns in the perpendicular direction 104 to the inspection direction for the image 120.

FIG. 20 illustrates exemplary images 140a and 140b captured by the imaging unit 12 according to the modification of the embodiment. When patterns are formed on a plane as illustrated in FIG. 6A, the image 110a captured by the imaging unit 12 (CCD sensor) according to the embodiment is equal to the image 140a captured by the imaging unit 12 (TDI sensor) according to the modification of the embodiment.

On the other hand, when patterns are formed on a face having difference in elevation as illustrated in FIG. 6B, the image 110b captured by the imaging unit 12 (CCD sensor) according to the embodiment is different from the image 140b captured by the imaging unit 12 (TDI sensor) according to the modification of the embodiment. In the image 110b, the magnifications are different in both the inspection direction (i.e., the x-direction) and the perpendicular direction 104 to the inspection direction (i.e., the y-direction) In the image 140b, the magnifications are different in the y-direction, whereas the magnifications are equal in the x-direction since the time integration is performed in the x-direction.

As described above, in the inspection apparatus 100 according to the modification of the embodiment, the image processor 13 changes the transfer speeds of the pieces of data to be integrated depending on the height position of the inspection target 200. With this configuration, it is capable of cancelling out the difference in magnification in the x-direction even when the inspection apparatus 100 captures an image of the inspection target 200 by using the Scheimpflug principle. For dealing with the difference in magnification in the y-direction, the brightness levels in the regions of the image 140b or the threshold value levels in comparing the image data representing the difference between the patterns with the threshold value may be shifted in accordance with the difference in magnification, as in the case where the imaging unit 12 is the CCD sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inspection apparatus comprising:
an irradiation mechanism to irradiate an inspection target with light;
an imaging device to capture an image of the inspection target through a lens;
a movable mechanism to change, with respect to an axis extending in an inspection direction for the inspection target, at least one of an angle between the lens and a horizontal plane and an angle between the imaging device and the horizontal plane such that a sample surface of the inspection target, a principal face of the lens, and an imaging face of the imaging device conform to the Scheimpflug principle;
a control processor to adjust sensitivities in an image of the sample surface of the inspection target captured by the imaging device depending on a position in a perpendicular direction to the inspection direction; and
an image processor to acquire data representing a difference between an image of a first pattern on the inspection target and an image of a second pattern corresponding to the first pattern on the inspection target, wherein
the imaging device captures the image of the first pattern and the image of the second pattern, and
the control processor adjusts, depending on the position in the perpendicular direction, the sensitivities in the image by changing a level of a threshold value applied when comparing the data representing the difference with the threshold value.

2. The inspection apparatus according to claim 1, wherein the imaging device is a charge coupled device (CCD) sensor, the imaging device capturing the image of the first pattern on the inspection target and the image of the second pattern corresponding to the first pattern on the inspection target, and
the control processor changes a comparison interval for comparison between the first pattern and the second pattern depending on a position of the first pattern and a position of the second pattern in the perpendicular direction, the comparison being performed by obtaining a difference between the first pattern and the second pattern from the images.

3. The inspection apparatus according to claim 2, wherein the sample surface of the inspection target conforming to the Scheimpflug principle has different heights depending on the position in the perpendicular direction, and
the control processor lengthens the comparison interval as the height of the sample surface of the inspection target depending on the position in the perpendicular direction increases and/or shortens the comparison interval as the height decreases.

4. The inspection apparatus according to claim 1, wherein the imaging device is a time delay integration (TDI) sensor, the imaging device capturing the image of the first pattern on the inspection target and the image of the second pattern corresponding to the first pattern on the inspection target, and
the control processor changes, depending on a position of the first pattern and a position of the second pattern in the perpendicular direction, a data transfer speed in integrating first data of the first pattern by the TDI sensor and a data transfer speed in integrating second data of the second pattern by the TDI sensor.

5. The inspection apparatus according to claim 4, wherein the sample surface of the inspection target conforming to the Scheimpflug principle has different heights depending on the position in the perpendicular direction, and
the control processor increases the data transfer speed in integrating the first data of the first pattern by the TDI sensor and the data transfer speed in integrating the second data of the second pattern by the TDI sensor, as the height of the sample surface of the inspection target depending on the position in the perpendicular direction increases and/or decrease those data speed transfer speeds as the height decreases.

6. The inspection apparatus according to claim 1, wherein the control processor
initializes at least one of the angle between the lens and the horizontal plane and the angle between the imaging device and the horizontal plane, based on design data used for designing the inspection target and the Scheimpflug principle, and
readjusts the initialized angle based on a distribution of gray levels in an image captured at the initialized angle.

7. The inspection apparatus according to claim 1, wherein the sample surface of the inspection target conforming to the Scheimpflug principle has different heights depending on the position in the perpendicular direction, and
the control processor adjusts the sensitivities in the image by decreasing the level of the threshold value as the height of the sample surface of the inspection target depending on the position in the perpendicular direction increases and/or by increasing the level of the threshold value as the height decreases.

8. An inspection method comprising:
changing, with respect to an axis extending in an inspection direction for an inspection target, at least one of an angle between a lens and a horizontal plane and an angle between an imaging device and the horizontal plane such that a sample surface of the inspection target, a principal face of the lens, and an imaging face of the imaging device conform to the Scheimpflug principle;
irradiating the inspection target with light;
capturing an image of the inspection target through the lens; and
adjusting sensitivities in an image of the sample surface of the inspection target depending on a position in a perpendicular direction to the inspection direction; wherein the capturing the image includes capturing an image of a first pattern on the inspection target and an image of a second pattern corresponding to the first pattern on the inspection target, and the adjusting includes adjusting, depending on the position in the perpendicular direction, the sensitivities in the image by changing a level of a threshold value applied when acquiring data representing a difference between the image of the first pattern and the image of the second pattern and comparing the data representing the difference with the threshold value.

9. The inspection method according to claim 8, wherein the capturing the image includes capturing, by a charge coupled device (CCD) sensor, the image of the first pattern on the inspection target and the image of the second pattern corresponding to the first pattern on the inspection target, and the method further comprising changing a comparison interval for comparison between the first pattern and the second pattern depending on a position of the first pattern and a position of the second pattern in the perpendicular direction, the comparison being performed by obtaining a difference between the first pattern and the second pattern from the images.

10. The inspection method according to claim 9, wherein the sample surface of the inspection target conforming to the Scheimpflug principle has different heights depending on the position in the perpendicular direction, and the changing the comparison interval includes lengthening the comparison intervals as the height of the sample surface of the inspection target is higher.

11. The inspection method according to claim 8, wherein the capturing the image includes capturing, by a time delay integration (TDI) sensor, the image of the first pattern on the inspection target and the image of the second pattern corresponding to the first pattern on the inspection target, and the method further comprising changing, depending on a position of the first pattern and a position of the second pattern in the perpendicular direction, a data transfer speed in integrating first data of the first pattern by the TDI sensor and a data transfer speed in integrating second data of the second pattern by the TDI sensor.

12. The inspection method according to claim 11, wherein the sample surface of the inspection target conforming to the Scheimpflug principle has different heights depending on the position in the perpendicular direction, and the changing the data transfer speeds includes increasing the data transfer speed in integrating the first data of the first pattern by the TDI sensor and the data transfer speed in integrating the second data of the second pattern by the TDI sensor, as the height of the sample surface of the inspection target is higher.

13. The inspection method according to claim 8, wherein the adjusting includes initializing at least one of the angle between the lens and the horizontal plane and the angle between the imaging device and the horizontal plane, based on design data used for designing the inspection target and the Scheimpflug principle, and readjusting the initialized angle based on a distribution of gray levels in an image captured at the initialized angle.

14. The inspection method according to claim 8, wherein the sample surface of the inspection target conforming to the Scheimpflug principle has different heights depending on the position in the perpendicular direction, and the adjusting includes decreasing the level of the threshold value as the height of the sample surface of the inspection target is higher.

* * * * *